United States Patent
Inazuka et al.

[11] Patent Number: 5,970,267
[45] Date of Patent: Oct. 19, 1999

[54] APPARATUS FOR SWITCHING VISUAL FIELD FRAME OF VIEW FINDER, OPERATION APPARATUS THEREFOR, AND APPARATUS FOR ACTURATING ROTARY OPERATION MEMBER HAVING NEUTRAL POSITION

[75] Inventors: Masahiro Inazuka, Chiba-ken; Hiroshi Ito, Saitama-ken, both of Japan

[73] Assignee: Asahi Kogaku Kogyo Kabushiki Kaisha, Tokyo, Japan

[21] Appl. No.: 09/010,996

[22] Filed: Jan. 22, 1998

[30] Foreign Application Priority Data

| Jan. 24, 1997 | [JP] | Japan | ................................... 9-011158 |
| Jan. 24, 1997 | [JP] | Japan | ................................... 9-011159 |
| Jan. 31, 1997 | [JP] | Japan | ................................... 9-019039 |

[51] Int. Cl.$^6$ .............................. G03B 13/12; G05G 1/10
[52] U.S. Cl. ............................. 396/380; 396/436; 74/553
[58] Field of Search .................................. 396/380, 436, 396/378, 435; 74/553

[56] References Cited

U.S. PATENT DOCUMENTS

| 5,345,285 | 9/1994 | Hasushita et al. | ....................... 396/379 |
| 5,386,259 | 1/1995 | Ichikawa et al. | .................... 396/380 X |
| 5,459,541 | 10/1995 | Arai et al. | ........................... 396/380 X |
| 5,587,755 | 12/1996 | Wilson et al. | .......................... 396/380 |
| 5,602,606 | 2/1997 | Yazawa | .................................... 396/435 |
| 5,640,631 | 6/1997 | Saito | ........................................ 396/380 |
| 5,652,932 | 7/1997 | Kobayashi et al. | ...................... 396/378 |
| 5,732,297 | 3/1998 | Tanaka et al. | ........................... 396/380 |
| 5,732,298 | 3/1998 | Nishizawa et al. | ...................... 396/380 |
| 5,784,658 | 7/1998 | Hata et al. | .......................... 396/380 X |

*Primary Examiner*—W. B. Perkey
*Attorney, Agent, or Firm*—Greenblum & Bernstein, P.L.C.

[57] ABSTRACT

A field frame switching apparatus for a finder in which an elongated standard visual field, a narrow-width visual field and a laterally-elongated visual field can be selected. A pair of narrow-width visual-field-forming light-interception frames are provided with vertical light-interception walls which are adapted to block out the right and left ends of the standard visual field. A pair of laterally-elongated visual-field-forming light-interception frames are provided with lateral-light-interception walls are adapted to block out the upper and lower ends of the standard visual field. An operation member is adapted to move the narrow-width visual-field-forming light-interception frames in a first direction toward a narrow-width field-frame-forming position in which the vertical light-interception walls are located within the standard visual field frame and in a second direction toward a laterally-elongated field-frame-forming position. An association movement mechanism moves the lateral-light-interception walls of the laterally-elongated field forming light-interception frames into or from the standard visual field frame. The invention also discloses an operation apparatus for the field frame switching apparatus, and an operation apparatus for a rotary operation member.

26 Claims, 16 Drawing Sheets

APPARATUS FOR SWITCHING VISUAL FIELD FRAME OF VIEW FINDER, OPERATION APPARATUS THEREFOR, AND APPARATUS FOR ACTURATING ROTARY OPERATION MEMBER HAVING NEUTRAL POSITION

BACKGROUND OF THE INVENTION

1. Field of the Invention

The present invention relates to an apparatus for switching a visual field frame of a view finder of a camera, an operation apparatus therefor, and an apparatus for actuating a rotary operation member having a neutral position.

2. Description of the Related Art

In a known APS (Advanced Photo System) camera using a self-advancing type of film cartridge, the picture plane size can be switched among a standard picture plane (high-vision size ratio of approximately 9:16), a narrow-width picture plane (classic size ratio of approximately 2:3) in which the lateral width of the standard field of view is reduced by partly interrupting the right and left sides of the standard picture plane, and a laterally-elongated picture plane (panoramic size ratio of approximately 1:3) in which the vertical length of the standard picture plane is reduced by partly interrupting the upper and lower sides of the standard picture plane. In such a camera, upon photographing, an object image is formed on a film at the standard picture plane size and data on the selected picture plane size for each frame of the film is magnetically recorded. The process to imprint the object image into each frame of selected picture plane size is carried out at the development stage or a stage subsequent thereto in accordance with the magnetically recorded data. Therefore, it is not necessary to provide a light intercepting mechanism in a light path of a photographing optical system of the camera in order to vary the lengthwise-crosswise ratio of the picture plane size. However, it is necessary to indicate the selected picture plane size in the finder in order to make it possible for a photographer to determine the composition. To this end, a field frame switching device is provided in the finder optical system.

For example, to realize a mechanical device for switching the (visual) field frame, a pair of L-shaped light-interception members can be provided opposed to form a laterally-elongated rectangular field frame, wherein the L-shaped light-interception members are moved in directions parallel with the major and minor sides of the rectangular field frame to define the narrow-width field of view corresponding to the classic size or the laterally-elongated field of view corresponding to the panoramic size, with respect to the standard field of view corresponding to the high vision size. However, in this arrangement, since the L-shaped light-interception members are moved in orthogonal directions, it is necessary to provide spaces substantially identical in size to the width of the light-interception members in the lengthwise and crosswise directions, so that the latter can be retracted and accommodated in the spaces. Moreover, a drive mechanism and a support mechanism to move and support the light-interception members in the lengthwise and crosswise directions are complicated.

Furthermore, since the finder field frame switching mechanism is complex, the incorporation of the same into the camera is troublesome. In particular, in an APS camera, since three different sizes of picture plane are possible, as mentioned above, the field frame switching mechanism is more complex and hence, it takes more time to assemble the camera than a normal camera.

In addition to the foregoing, in the above-mentioned field frame switching mechanism, if the movable light-interception members are directly connected to an external operation device, when the light-interception members are moved by the external operation device, a mal-function of the light-interception members may occur due to the assembling error. To prevent this, there is a 'play' (tolerance) provided between the operation device and the light-interception members. It is preferable in view of the facilitation of the assembling operation that the play be large since camera components become small as the camera becomes compact. However, the play provided between the light-interception members and the operation device causes the following problems:

In an APS camera, since the light-interception members are moved to narrow the width of the picture plane or laterally-elongated the picture plane with respect to the standard picture plane (neutral position), it is necessary to provide a holding means for holding the light-interception members at the neutral position. If the neutral position holding means is provided on the movable light-interception members, the structure is complicated, thus resulting in a deteriorated assembling operation. Therefore, the neutral position holding means is usually located on the operation device. For instance, a dial member which can be externally rotated is provided with a click stop mechanism, so that the light-interception members can define predetermined sizes of the field frame corresponding to a plurality of click positions of the dial member. However, since there is play between the operation device and the light-interception members and there is no mechanism which holds the light-interception members at the neutral position, there is a possibility that the positional deviation of the light-interception members takes place. Moreover, if the neutral position holding means is composed only of an engagement mechanism such as a click stop mechanism, the positional deviation of the light-interception members occurs due to the error in the holding means. Also, an error in the amount of play between the operation device and the light-interception members must be taken into account to precisely move the light-interception members from the neutral position to a predetermined position in the forward or reverse direction.

The above-mentioned problem can be applied not only to the field frame switching mechanism of the finder, but also, for example, to the rotary operation member which has a neutral position and predetermined angular positions on opposite sides of the neutral position in the forward and reverse directions. Namely, if the rotary operation member and the operation device are assembled with a tolerance therebetween, it is difficult to obtain the correct neutral position and the correct angular positions.

SUMMARY OF THE INVENTION

It is an object of the present invention to provide a simple finder field frame switching apparatus for a camera in which the picture plane can select three sizes corresponding to a standard field of view, a narrow-width field of view in which the right and left side edges of the standard field of view are blocked out, and a laterally-elongated field of view in which the upper and lower end edges of the standard field of view are blocked out, wherein the drive mechanism is simplified; the required space can be reduced; and the assembling operation can be facilitated.

Another object of the present invention is to provide an operation apparatus of a visual field frame switching apparatus which can be easily assembled and wherein no positional deviation of a light intercepting member occurs.

Yet another object of the present invention is to provide an apparatus for actuating a rotary operation member having a neutral position, wherein the apparatus can be easily assembled and the neutral position and predetermined angular positions of the rotary operation member in forward and reverse directions can be reliably obtained.

According to an aspect of the present invention, there is provided a field frame switching apparatus for a finder in which a standard visual field, a narrow-width visual field in which the standard visual field is partly blocked out at right and left ends thereof, and a laterally-elongated visual field in which the standard visual field is partly blocked out at upper and lower ends thereof can be selected. The frame switching apparatus includes a pair of narrow-width visual-field-forming light-interception frames which are movable in the right and left directions of the standard visual field and which are provided with vertical light-interception walls which are adapted to block out the right and left ends of the standard visual field. Further, a pair of laterally-elongated visual-field-forming light-interception frames are included which are movable in the upward and downward directions of the standard visual field and which are provided with lateral-light-interception walls which are adapted to block out the upper and lower ends of the standard visual field. Also, an operation member is included which is adapted to move the narrow-width visual-field-forming light-interception frames in a first direction toward a narrow-width field-frame-forming position in which the vertical light-interception walls are located within the standard visual field frame and in a second direction toward a laterally-elongated field-frame-forming position, with respect to a standard field-frame-forming position in which the vertical light-interception walls are located out of the standard visual field frame. Furthermore, an association movement mechanism is included which moves the lateral-light-interception walls of the laterally-elongated field forming light-interception frames into or from the standard visual field frame in association with the movement of the narrow-width field forming light-interception frames when the narrow-width field forming light-interception frames are moved between the standard field-frame-forming position and the laterally-elongated field-frame-forming position.

Preferably, the association movement mechanism includes a pair of projections provided on one of the narrow-width field forming light-interception frames, and a pair of swing cam members which are provided with cam surfaces engaging with the projections and which rotate about axes substantially perpendicular to a plane in which the field frame lies in accordance with the linear movement of the narrow-width field forming light-interception frames, wherein said swing cam members rotate to move the laterally-elongated field forming light-interception frames in opposite directions and in the upward and downward directions of the standard visual field.

Preferably, the swing cam members are arranged in parallel with the major sides of the standard visual field, and the laterally-elongated visual-field-forming light-interception frames include a first laterally rectangular light-interception wall which are directly supported by the swing cam members and a second lateral-light-interception wall which are supported by the swing cam members through support members which extend in the vertical direction of the standard visual field.

In an embodiment, the operation member is provided with a shaft member which rotates about an axis perpendicular to a plane in which the visual field frame lies, and a swing member separate from the swing cam members is provided to linearly move the narrow-width field forming light-interception frames in opposite lateral directions of the standard visual field in association with the rotation of the operation member.

In the present invention, it is possible to adopt the association relationship between the narrow-width field defining light-interception frames and the laterally-elongated field defining light-interception frames opposite to the above mentioned association relationship.

According to another aspect of the present invention, there is provided a field frame switching apparatus for a finder in which an elongate standard visual field, a narrow-width visual field in which the standard visual field is partly blocked out at right and left ends thereof, and a laterally-elongated visual field in which the standard visual field is partly blocked out at upper and lower ends thereof can be selected. Further, a first plate is included having an opening for a standard visual field. Also, a pair of narrow-width visual-field-forming light-interception frames are included which are movable in the right and left directions of the standard visual field and which are provided with vertical light-interception walls which are adapted to block out the right and left ends of the standard visual field. Also, a pair of laterally-elongated visual-field-forming light-interception frames are included which are movable in the upward and downward directions of the standard visual field and which are provided with lateral-light-interception walls which are adapted to block out the upper and lower ends of the standard visual field. Also, an operation member is included which is adapted to move the narrow-width visual-field-forming light-interception frames in a first direction toward a narrow-width field-frame-forming position in which the vertical light-interception walls are located within the standard visual field frame and in a second direction toward a laterally-elongated field-frame-forming position, with respect to a standard field-frame-forming position in which the vertical light-interception walls are located out of the standard visual field frame. Furthermore, an association movement mechanism is included which moves the lateral-light-interception walls of the laterally-elongated field forming light-interception frames into or from the standard visual field frame in association with the movement of the narrow-width field forming light-interception frames when the narrow-width field forming light-interception frames are moved between the standard field-frame-forming position and the laterally-elongated field-frame-forming position and a second plate having an opening for a standard visual field which corresponds to the opening of the first plate. The first plate and second plates hold the narrow-width field forming light-interception frames, the laterally-elongated field forming light-interception frames, and the association movement mechanism therebetween so as to form an assembly unit.

The portion of the assembly unit held between the first and second plates is preferably separate from the operation member.

In an embodiment, the operation member includes a shaft portion which is rotatable about an axis perpendicular to a plane in which the standard field frame lies, and provision is made of a swing member which is held between the first and second plates and which linearly moves the narrow-width field forming light-interception frames in the lateral opposite directions of the standard visual field in accordance with the rotation of the operation member. Also, the swing member is provided with a non-circular hole which is adapted to connect the same to the operation member to thereby form a unit. The field frame switching apparatus is preferably mounted to a finder body as a unit.

According to another aspect of the present invention, there is provided an operation apparatus for a field frame switching mechanism of a finder. A field frame switching mechanism is included which is adapted to change the size of the field frame among an elongate standard visual field, a narrow-width visual field in which the standard visual field is partly blocked out at right and left ends thereof, and a laterally-elongated visual field in which the standard visual field is partly blocked out at upper and lower ends thereof. Further, a swing member is included which has an axis about which the swing member is rotated. The swing member actuates the field frame switching mechanism by the swing movement thereof about the axis. Also, a shaft member is included separate from the swing member. The shaft member is rotatable about a central shaft portion thereof and the shaft member rotates the swing member about the axis thereof when the shaft member is rotated about the central shaft portion. The shaft member is provided with a neutral angular position and predetermined forward and rearward angular positions in opposite directions from the neutral angular position, so that the field frame switching mechanism defines the standard visual field through the swing member when the shaft member is in the neutral angular position, and defines the narrow-width visual field and the laterally-elongated visual field when the shaft member is located in the predetermined forward and rearward angular positions, respectively. Furthermore, a spring means is included for normally holding the shaft member at the neutral angular position and for exerting a spring force on the shaft member to return the same to the neutral angular position when the shaft member is rotated in predetermined forward and rearward directions from the neutral angular position.

The neutral position holding means which is provided outside the field frame switching mechanism can be easily assembled.

The spring means can include a first torsion spring which engages with a projection provided on the camera body and the radial projection of the shaft member to hold the shaft member at the neutral angular position.

The operation apparatus can further include a dial member which can be externally rotated and which is provided with a pair of spring ends that hold therebetween the radial projection of the shaft member. The spring ends are adapted to rotate the shaft member about the axis thereof through the radial projection against the first torsion spring when the dial member is rotated. The spring ends are capable of elastically deforming. Since the neutral position is held by the first torsion spring, it is possible to provide a certain amount of play between the shaft member and the dial member. Moreover, since the field frame switching mechanism is elastically actuated through the spring ends provided on the dial member, no positional deviation or mal-function of the light-interception member tend to occur.

The spring ends can be provided on a second torsion spring which is provided with a coil portion that is supported by the shaft portion of the dial member. The spring ends are twisted and biased in a direction to come close to each other. The dial member can be provided with a stop portion which keeps the distance between the spring ends in the free state, at a predetermined value so that the radial projection of the shaft member is inserted between the spring ends having a certain amount of play.

Preferably, provision is made for a click mechanism provided between the dial member and the camera body to hold the dial member at a neutral position or predetermined angular positions angularly spaced from the neutral position in opposite directions against the spring force of the first and second torsion spring.

However, if the angular displacement of the dial member and the amount of movement of the light-interception frames are identical, it would be impossible to move the light-interception frames to a desired position due to an assembling error of the shaft member and the dial member.

To prevent this, it is preferable that the movement of the light-interception member of the field frame switching mechanism be restricted at a narrow-width field forming position or a laterally-elongated field forming position with respect to a standard field forming position and that the click positions of the dial member rotated from the neutral position in opposite directions be set at positions in which the light-interception member is moved beyond the restriction positions.

Consequently, the spring ends of the second torsion spring are elastically deformed due to a difference between the angular displacement of the dial member and the movement of the light-interception member, so that the light-interception member can be held at the restriction position due to the restoring force of the spring ends.

The dial member can be incorporated in the camera body after the field frame switching mechanism and the shaft member are incorporated in the camera body. The swing member is preferably separate from the shaft member and they are interconnected so as not to relatively rotate after the field frame switching mechanism is assembled.

In an embodiment, the radial projection of the shaft member is in the form of a crank shaft comprised of a connecting portion extending in the radial direction and an eccentric shaft portion which extends from one end of the connecting portion in parallel with the center axis of the shaft member, so that the eccentric shaft portion is inserted between the spring ends of said second torsion spring.

The center axis of the shaft member is preferably perpendicular to the rotation axis of the dial member.

According to yet another aspect of the present invention, there is provided an operation apparatus for a rotary operation member having a neutral position, including a shaft member having a central shaft portion and a radial projection extending from the central shaft portion in the radial direction, said shaft member being rotatable about the central shaft portion. The shaft member being provided with a neutral angular position and predetermined angular forward and rearward positions in opposite directions from the neutral angular position. Also, a first torsion spring means is included for normally holding the shaft member at the neutral angular position and for exerting a spring force on the shaft member to return the same to the neutral angular position when the shaft member is rotated in a predetermined direction from the neutral angular position. Further, a dial member is included which can be externally rotated. Also, a second torsion spring means having a coil portion which is supported by the shaft portion of the dial member and a pair of spring ends which are biased in a direction to come close to each other so that the radial projection of the shaft member is located between the spring ends. The second torsion spring means being stronger than the first torsion spring means. Furthermore, a stop means provided on the dial member is included, for keeping, in the free state, the distance between the spring ends of the second torsion spring means at a predetermined value so that the radial projection is inserted between the spring ends having a certain amount of play.

The present disclosure relates to subject matter contained in Japanese Patent Applications Nos. 9-11158 (filed on Jan. 24, 1997), 9-11159 (filed on Jan. 24, 1997) and 9-19039 (filed on Jan. 31, 1997) which are expressly incorporated herein by reference in their entireties.

BRIEF DESCRIPTION OF THE DRAWINGS

The invention will be discussed below in detail with reference to the accompanying drawings in which.

DESCRIPTION OF THE PREFERRED EMBODIMENT

Figure 1:
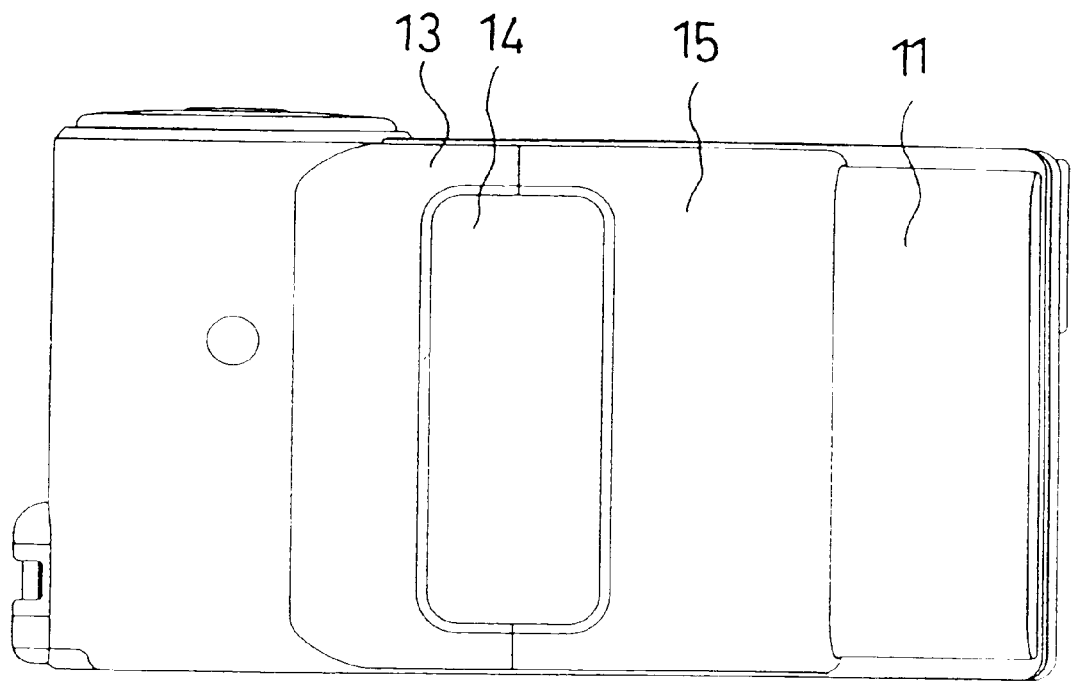
FIG. 1 is a front elevational view of a camera having a field frame switching apparatus, when a photographing lens is retracted, according to the present invention.
Figure 2:
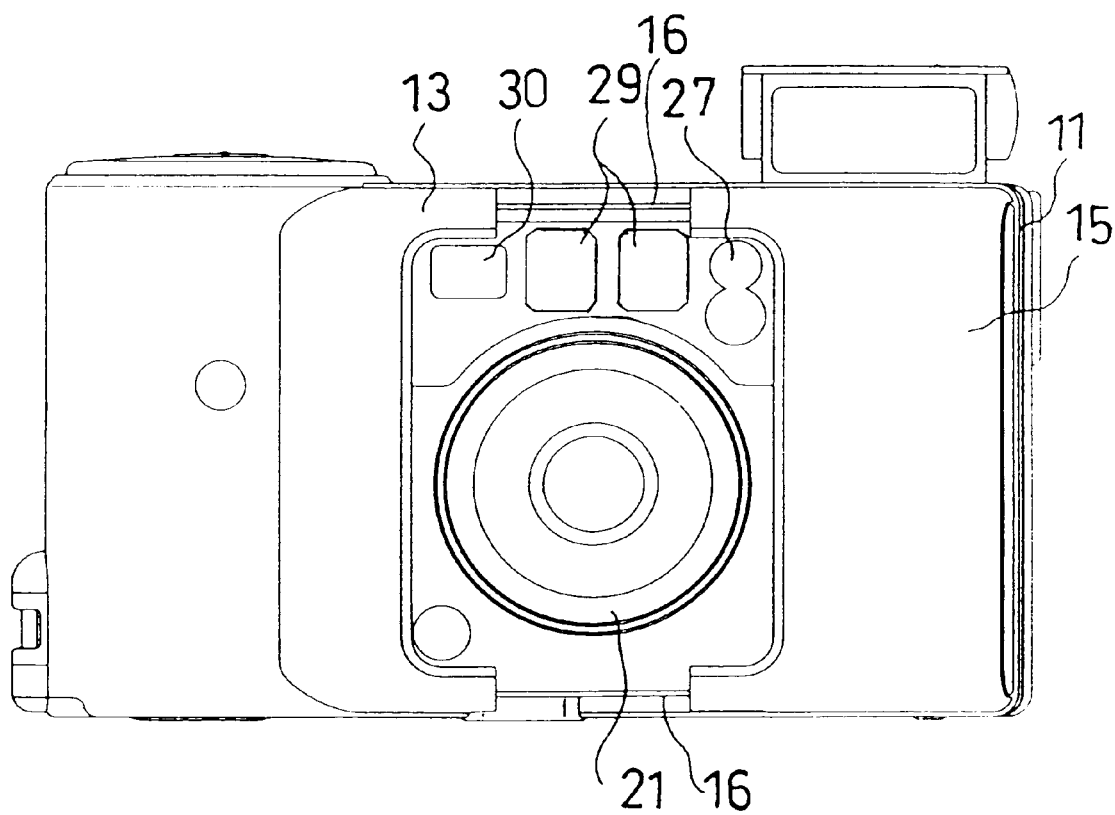
FIG. 2 is a front elevational view of a camera of FIG. 1 shown in a operational position.
Figure 3:
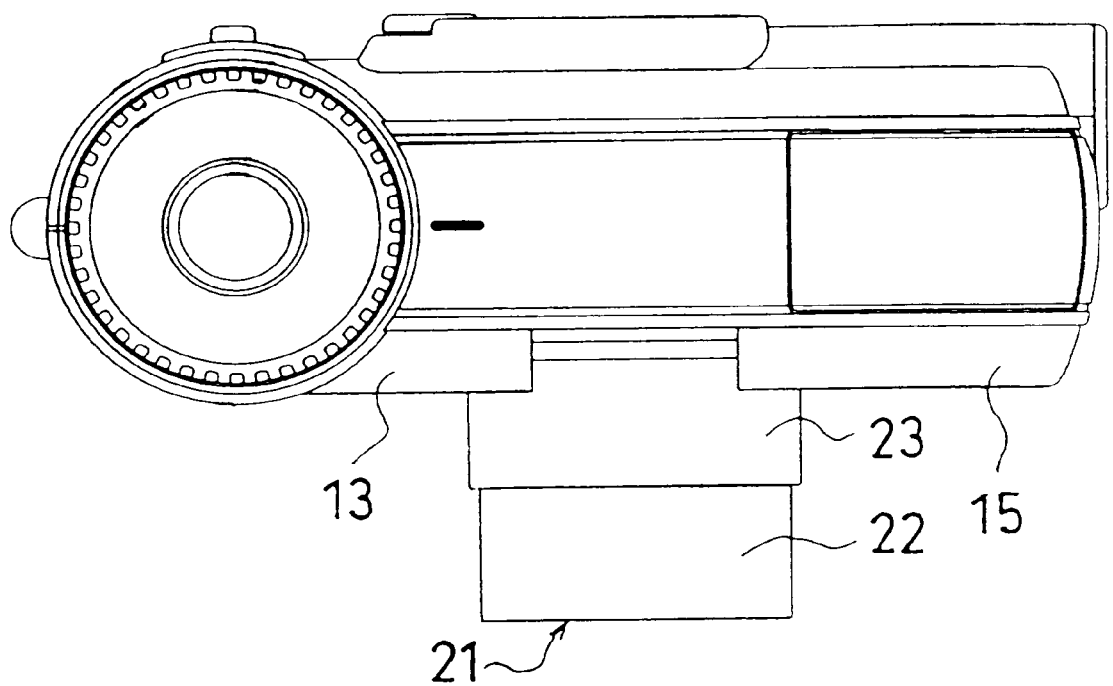
FIG. 3 is a plan view of a camera shown in FIG. 1.
Figure 4:
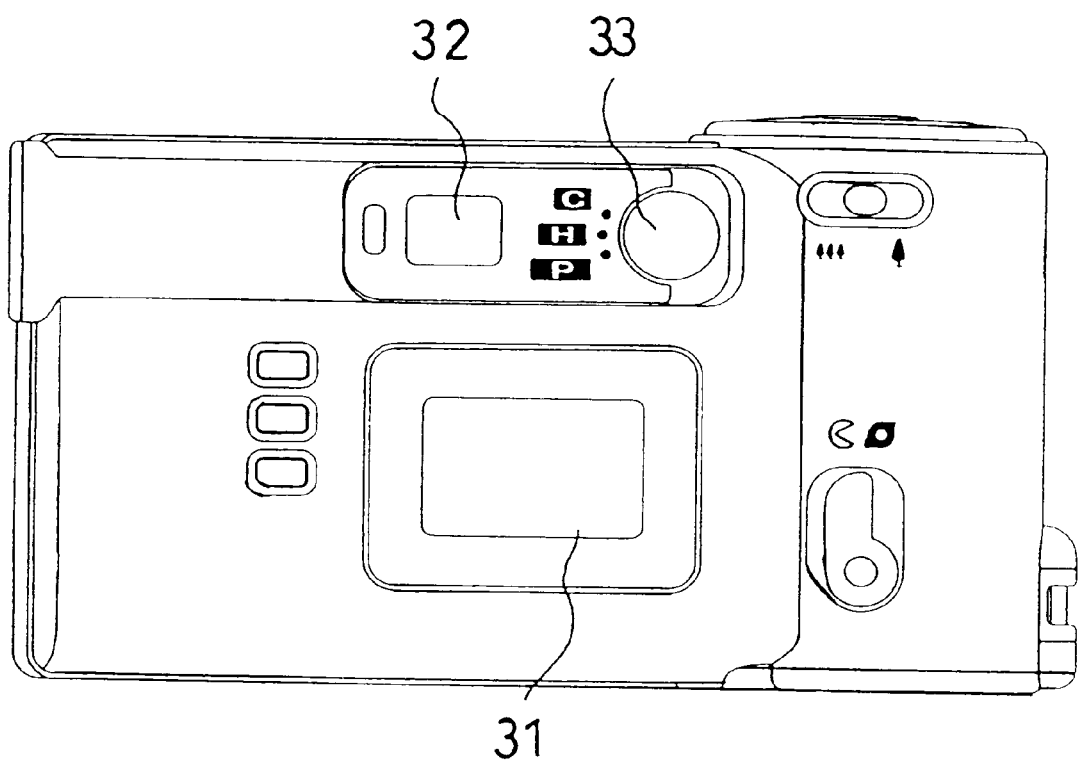
FIG. 4 is a rear elevational view of a camera shown in FIG. 1.
Figure 5:
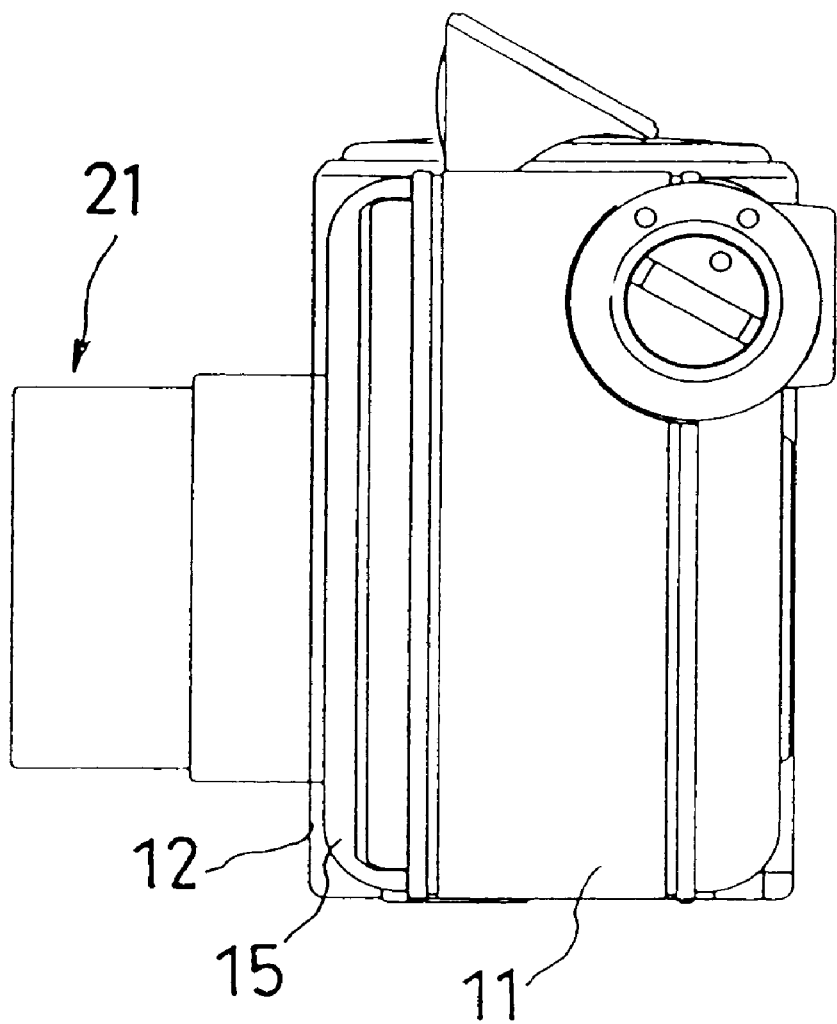
FIG. 5 is a side elevational view of a camera of FIG. 1 shown in a operational position.
Figure 6:
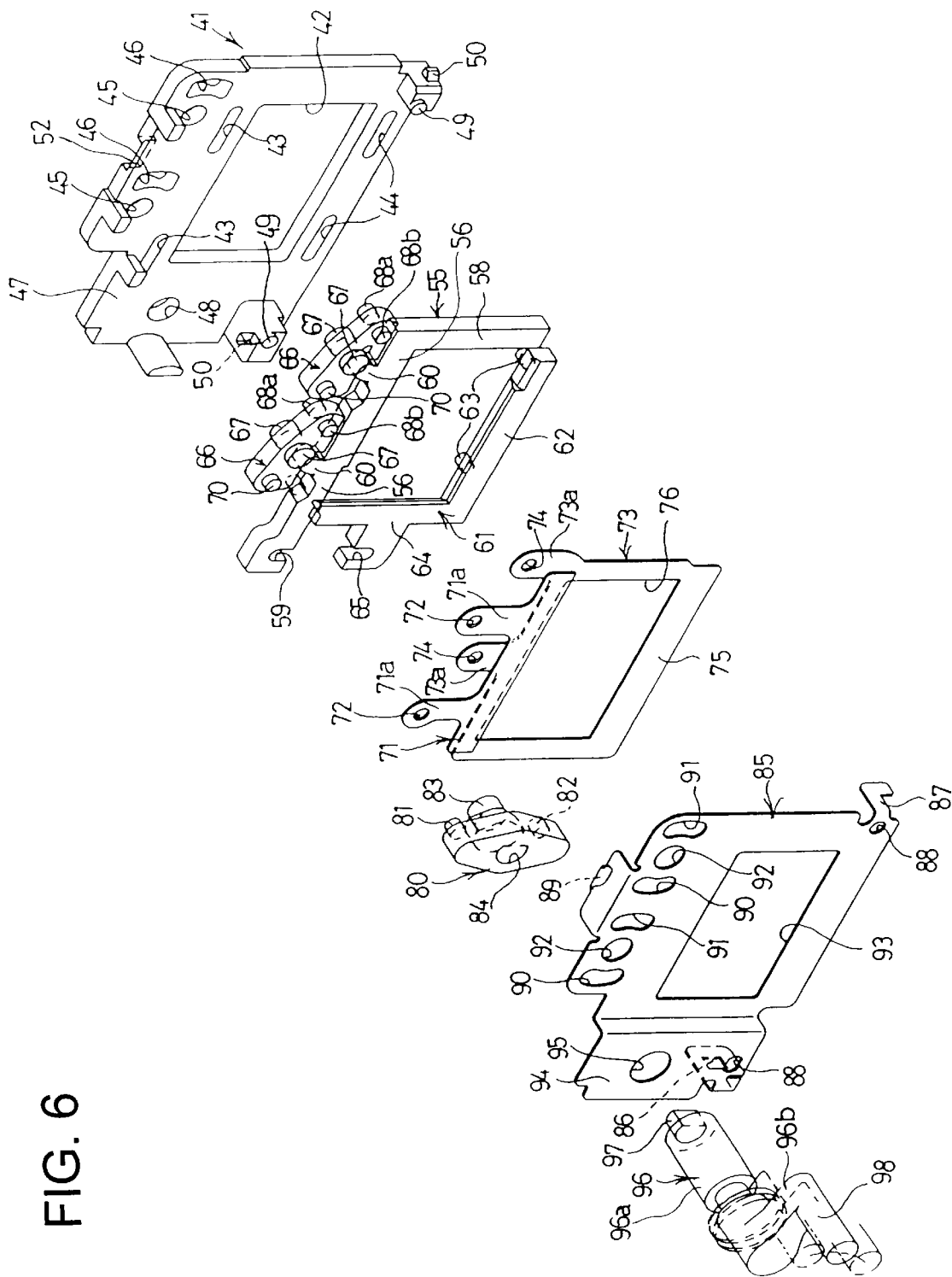
FIG. 6 is an exploded perspective view of a finder field frame switching apparatus.

FIGS. 1 through 5 show an embodiment of an APS camera using a self-advancing type of film cartridge, to which a finder field frame switching apparatus and an operation device therefor according to the present invention are applied. The camera is provided on the camera body 11 thereof with a zoom lens barrel 21. The zoom lens barrel 21 is composed of first and second lens barrels 22 and 23 and is movable in the optical axis direction between a rear accommodation position and a front photographing position (i.e., within a zoom range). The zoom lens barrel 21 is of a collapsible mount type in which it is retracted in the camera body 11. The zoom lens barrel 21 is moved in the axial direction by a zoom motor provided in the camera body 11. The camera body 11 is provided on its front surface with a stationary cover 13, an accommodation cover 14 and a sliding cover 15 to protect the zoom lens barrel 21 retracted in the camera body. The stationary cover 13 is secured to the camera body 11 and the sliding cover 15 is supported to move in the longitudinal direction of the camera body 11 along sliding rails 16. The accommodation cover 14 is associated with the sliding cover 15 and closes a vertically elongated rectangular opening defined between the cover 13 and the sliding cover 15 in a closed position in which the sliding cover 15 abuts against the stationary cover 13 (FIG. 1). In an open position in which the sliding cover 15 is moved away from the stationary cover 13, the accommodation cover 14 is moved together with the sliding cover 15 in the same direction and is further moved behind the sliding cover 15, so that the zoom lens barrel 21 can be exposed (FIG. 2). The camera body 11 is provided on the front surface thereof with a photometering window 27, a focusing window (object distance measuring window) 29 and a finder opening 30, which are all exposed when the covers 14 and 15 are opened.

The camera is provided with a main switch (not shown) which is actuated immediately before the sliding cover 15 reaches the full-open position from the closed position or when the sliding cover 15 is slightly moved from the full-open position toward the closed position. Namely, the main switch is turned ON immediately before the sliding cover 15 reaches the full-open position and is turned OFF when the sliding cover 15 is slightly moved from the full-open position toward the closed position. When the main switch is turned ON, the zoom motor is driven in the forward direction to advance the lens barrels 22 and 23 to the photographable position. When the main switch is turned OFF, the zoom motor is reversed to retract the lens barrels 22 and 23 rearward to the retracted position.

The camera body 11 is provided on the substantially center portion of the rear surface thereof with an LCD panel 31, and on the upper and center portion, with an eyepiece 32 of the finder, and on the upper and right portion, with a picture plane switching dial 33. The dial 33 is normally located at a neutral position corresponding to the high vision size H and can be moved to the classic size position C or the panoramic size position P to switch the picture plane size.

A finder optical system is provided between the finder opening 30 on the front surface and the eyepiece 32 on the rear surface. To make it possible for a photographer to determine the composition while viewing an object to be photographed through the eyepiece 32, a field frame switching apparatus is provided in the finder optical system to switch the visual field frame in accordance with the picture plane size selected by the switching dial 33. The operation of the switching dial 33 is transmitted to the field frame switching mechanism through an operation device which will be discussed hereinafter.

FIGS. 6 through 11 show the field frame switching apparatus of the finder in the camera body 11. The components of the field frame switching apparatus will be discussed below with reference to FIG. 6. A substrate 41 is provided, on the substantially center portion thereof, with a laterally-elongated rectangular opening 42. There are a pair of guide grooves 43 and a pair of guide grooves 44 above and below the rectangular opening 42, respectively. The guide grooves 43 and 44 extend in parallel with the major sides of the rectangular opening 42. A circular hole 45 and an arched guide hole 46 are provided on each of the upper guide grooves 43. The substrate 41 is provided with a bearing plate 47 which extends from one end of the substrate adjacent the minor side of the rectangular opening 42 and which is equipped with a circular bearing hole 48. The substrate 41 is provided on the lower right and left ends thereof with a pair of pins 49 which project forward and a pair of projections 50 on the sides of the pins 49. The substrate 41 is equipped on the upper end with a hook recess 52.

A pair of guide pins 57 (FIGS. 7 through 9) provided on the side surface of a lateral or long arm 56 of a first L-shaped light-interception member 55 are slidably fitted in the guide grooves 43 above the rectangular opening 42. The long arm 56 is connected at its one end to a vertical arm 58 which extends perpendicular thereto to define a light-interception wall. The long arm 56 is provided on the other end with an elongated groove 59 which extends substantially in parallel with the light-interception wall 58 (vertical arm). The lateral arm 56 is provided on its upper surface with a pair of cam projections 60.

A pair of guide pins 63 provided on the side surface of a lateral or long arm 62 of a second L-shaped light-interception member 61 are slidably fitted in the guide grooves 44 below the rectangular opening 42. The long arm 62 is connected at one end thereof to a vertical arm 64 which extends perpendicular thereto to define a light-interception wall. The long arm 64 is provided on one side thereof with an elongated groove 65 which is opposed to the elongated groove 59.

Operation projections 81 and 82 of a swing member 80 are rotatably and slidably fitted in the elongated grooves 59 and 65 of the first and second L-shaped light-interception members 55 and 61, respectively. The swing member 80 has a shaft 83 located at an median point between the operation projections 81 and 82. The shaft 83 is rotatably fitted in the bearing hole 48 of the substrate 41. The swing member 80 is provided, on the surface thereof opposite to the shaft 83, with a non-circular connection hole 84. When the swing member 80 is rotated in the forward or reverse direction with respect to a position shown in FIG. 7, the first and second L-shaped light-interception members 55 and 61 are moved in opposite directions (right and left directions) in parallel with the major sides of the rectangular opening 42 through the guide grooves 43 and 44 by the same amount of movement. Consequently, the light-interception walls 58 and 64 are traversed close to or away from one another in the lateral direction of the rectangular opening 42 while keeping a parallel relationship. In connection with the first and second L-shaped light-interception members, the position in which the light-interception walls 58 and 64 come closest to each other will be referred to as a narrow-width field-frame-forming position and the position in which the light-interception walls 58 and 64 are located farthest from one another will be referred to as a laterally-elongated field-frame-forming position, respectively.

As mentioned above, the substrate 41 is provided on the upper end thereof with a pair of circular holes 45 which are spaced from the upper end edge of the rectangular opening 42 at the same distance, so that a pair of shafts 67 of swing cams 66 are rotatably supported in the circular holes 45. The swing cams 66 are provided with swing guide pins 68a adjacent to the shafts 67. The guide pins 68a are slidably fitted in the arched guide holes 46 of the substrate 41. Consequently, the swing cams 66 swing within a predetermined range defined by the movement of the guide pins 68a in the arched guide holes 46.

Figure 7:
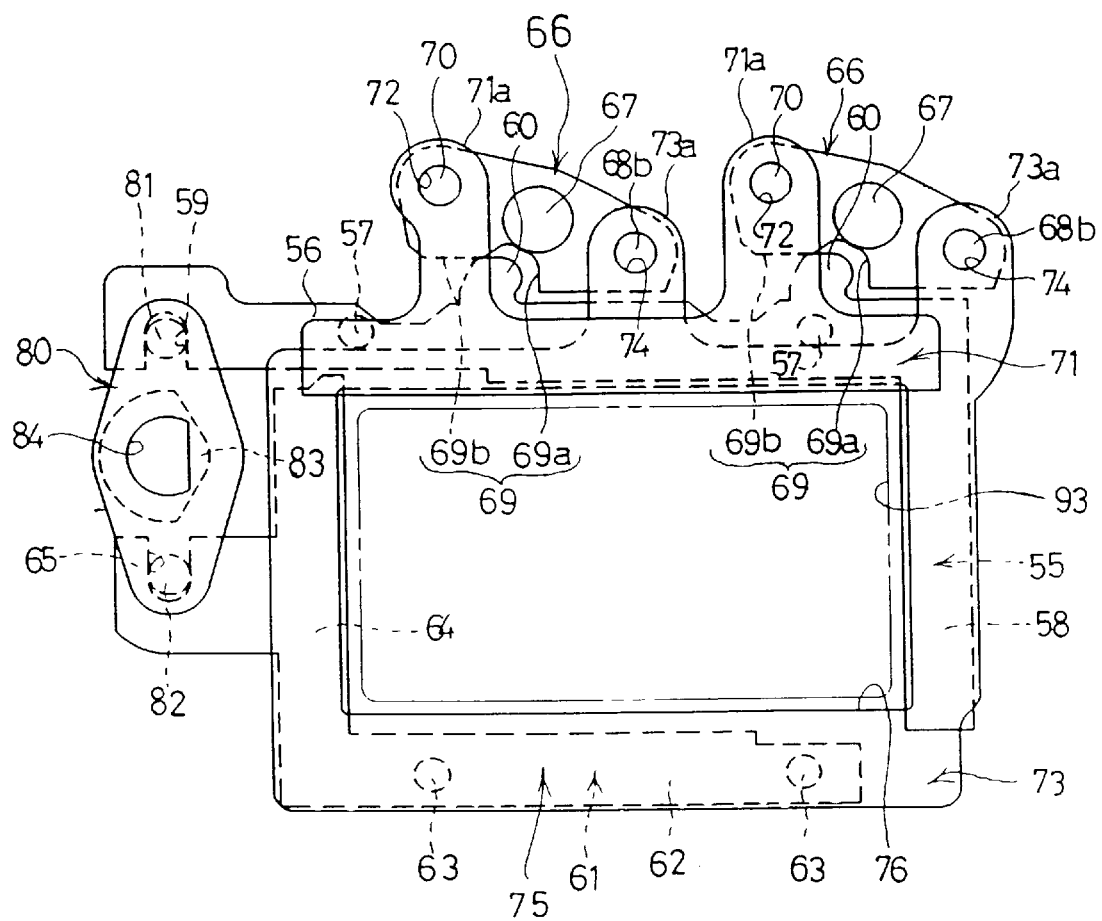
FIG. 7 is a front elevational view of a field frame switching apparatus in a standard picture plane state (high vision size)
Figure 8:
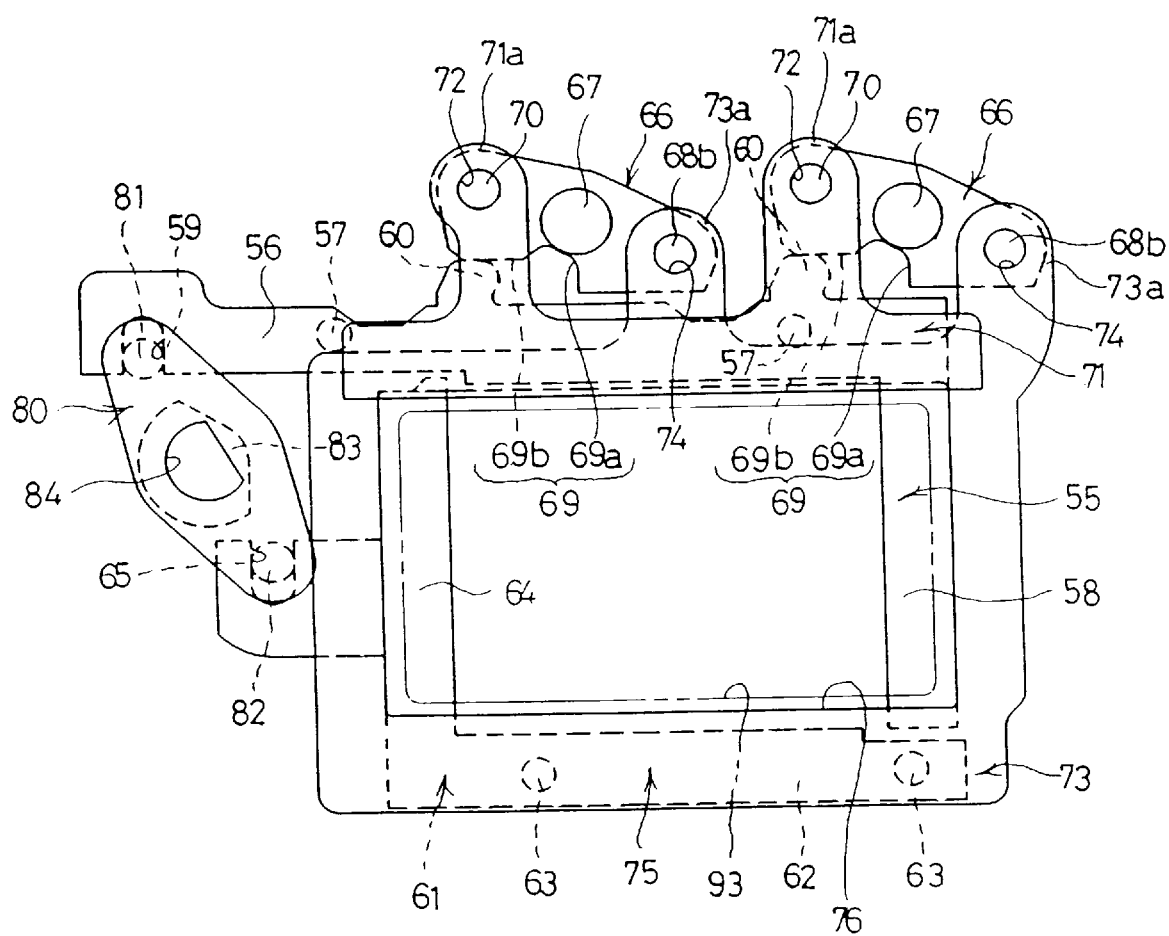
FIG. 8 is a front elevational view of a field frame switching apparatus in a narrow-width picture plane state (classic size)
Figure 9:
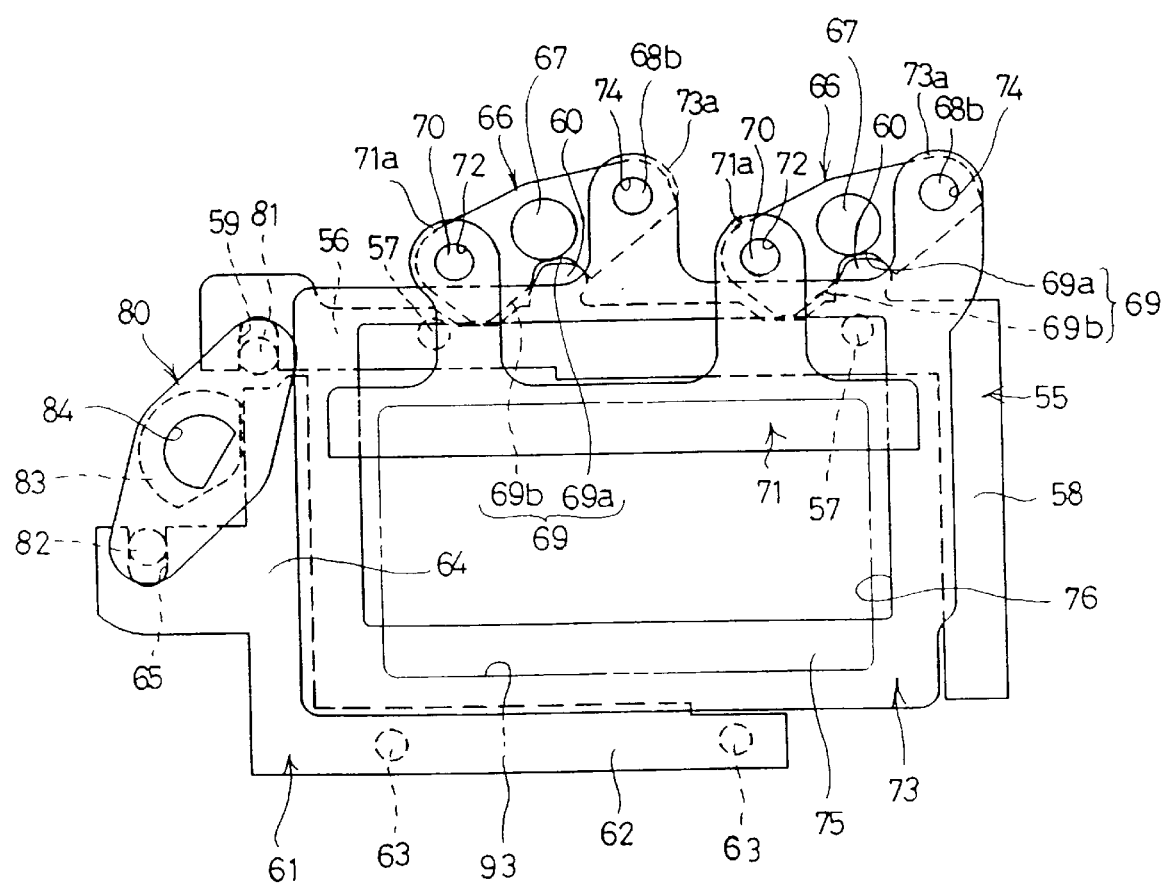
FIG. 9 is a front elevational view of a field frame switching apparatus in a laterally-elongated picture plane state (panoramic size)

Cam surfaces 69 (FIGS. 7 through 9) which engage with the cam projections 60 of the first L-shaped light-interception member 55 are formed on the lower surface of the swing cams 66. The cam surfaces 69 have recessed cam surfaces 69a in the vicinity of the shafts 67 and planar surface portions 69b. The swing cams 66 are provided with first hanging pins 68b projecting from the surfaces of the swing cams opposite to the guide pins 68a. The swing cams 66 are also provided with second hanging pins 70 which are located in symmetric arrangement with the first hanging pins with respect to the shafts 67. When the cam engaging projections 60 engage with the planar surface portions 69b of the cam surfaces 69, the second hanging pins 70 are raised, and the first hanging pins 68b are lowered (FIGS. 7 and 8). When the cam engaging projections 60 engage with the recessed cam surfaces 69a of the cam surfaces 69, the first hanging pins 68b are raised and the second hanging pins 70 are lowered. (FIG. 9).

A lateral-light-interception plate 71 is provided adjacent to the side surface of the lateral arm 56 of the first L-shaped light-interception member 55. The light-interception plate 71 is composed of a pair of upwardly extending hanging arms 71a which are provided with pin receiving holes 72 through which the second hanging pins 70 of the swing cams 65 extend. A frame-like light-interception plate 73 is provided close to the side surfaces of the first and second light-interception members 55 and 61. The light-interception frame 73 is provided on its upper end with a pair of hanging arms 73a. The hanging arms 73a have pin receiving holes 74 through which the first hanging pins 68b of the swing cams 66 extend. The lower frame element 75 of the light-interception frame 73 constitutes a lateral-light-interception portion extending in parallel with the lateral-light-interception plate 71. The inner peripheral edge of the light-interception frame 73 defines a rectangular opening 76 whose size is substantially identical to the size of the rectangular opening 42 of the substrate 41.

When the swing cams 66 rotate about the axes of the shafts 67, the lateral-light-interception plate 71 suspended from the second hanging pins 70 and the light-interception frame 73 suspended from the first hanging pins 68b are moved by the same amount in opposite directions and in the upward and downward directions of the rectangular opening 42 while slightly changing the lateral positions thereof. Consequently, the lateral-light-interception plate 71 and the lateral-light-interception portion 75 come close to or away from each other in the upward and downward directions of the rectangular opening 42.

An auxiliary plate 85 is provided adjacent the lateral-light-interception plate 71 and the light-interception frame 73. The auxiliary plate 85 is secured to the substrate 41 by engaging an engaging hole 86 and a hook 87 with the pair of projections 50 provided on the lower end of the substrate 41, inserting the pair of insertion pins 49 into the small circular holes 88, and fitting the hook 89 into the hook recess 52 of the substrate 41. In this state, the second hanging pins 70 which extend through the pin receiving holes 72 of the lateral-light-interception plate 71 are slidably fitted in the arched guide holes 90 formed in the auxiliary plate 85. Likewise, the first hanging pins 68b which extend through the pin receiving holes 74 of the light-interception frame 73 are slidably fitted in the arched guide holes 91 formed in the auxiliary plate 85. The auxiliary plate 85 is also provided with a pair of circular holes 92 between the arched guide holes 90 and the arched guide holes 91, so that the shafts 67 of the swing cams 66 are rotatably supported in the circular holes 92.

The auxiliary plate 85 defines, at its center portion, a rectangular opening 93 whose size is such that the length ratio in lengthwise and crosswise directions is approximately 9:16 corresponding to the standard field frame (high vision size). The rectangular opening 42 of the substrate 41 and the rectangular opening 76 of the light-interception frame 73 are slightly larger than the rectangular opening 93, so that the standard field frame can be obtained without being interrupted by the auxiliary plate 85 or the substrate 41 due to an assembling error therebetween.

The vertical light-interception walls 58 and 64 of the first and second L-shaped light-interception members 55 and 61 are located inside the right and left side edges of the rectangular opening 93. Thus, the first and second L-shaped light-interception members 55 and 61 define the narrow-width field frame (classic size) in which the right and left end edges of the standard field frame are interrupted in accordance with the swing movement of the swing member 80. The lateral-light-interception plate 71 and the light-interception frame 73 (light-interception member 75) are located inside the upper and lower end edges of the rectangular opening 93 when the narrow-width field frame defining frames are moved to the laterally-elongated field-frame-forming position. Thus, the lateral-light-interception plate 71 and the light-interception frame 73 define the laterally-elongated field frame (panoramic size) in which the upper and lower end edges of the standard field frame are interrupted in accordance with the swing movement of the swing cams 66. The cam engaging projections 60 of the first L-shaped light-interception member 55 and the swing cams 66 which are engaged and driven thereby constitute an association movement mechanism for driving the laterally-elongated field frame in response to the movement of the narrow-width field frame defining frames.

The finder field frame switching apparatus forms an assembly unit in which the narrow-width field-frame-forming frames, the laterally-elongated field-frame-forming frames and the association movement mechanism are assembled with the substrate 41 and held by the auxiliary plate 85.

The auxiliary plate 85 is provided with a side plate 94 on one side of the rectangular opening 93 which is in turn provided with a through hole 95 through which the connection hole 84 of the swing member 80 is exposed. A connection pin 97 of a switching lever (operation member) 96 is fitted in the connection hole 84 through the through hole 95. The connection hole 84 and the connection pin 97 are both non-circular in cross section, and hence, they are interconnected so as not to relatively rotate, so that the rotation of the switching lever 96 can be transmitted to the swing member 80.

The switching lever 96 is in the form of a crank shaft and is composed of a center shaft portion 96a, a radial arm 96b connected thereto and extending therefrom in the radial direction, and an eccentric shaft portion 98 which extends from one end of the radial arm 96b in parallel with the center shaft portion 96a. When the eccentric shaft portion 98 is rotated, the swing member 80 is rotated about the axis of the shaft 83 through the center shaft portion 96a. As mentioned above, the swing member 80 slides the first and second L-shaped light-interception members 55 and 61 in opposite directions, i.e., in the right and left directions of the high vision field frame. Since the sliding movement occurs through the guide grooves 43 and 44 formed on the substrate 41, the swing member 80 swings within a predetermined angular range. Consequently, the amount of rotation of the switching lever 96 corresponds to the amount of the sliding movement of the first and second L-shaped light-interception members 55 and 61. The rotation of the switching lever 96 is stopped when the guide pins 57 and 63 abut against the ends of the guide grooves 43 and 44 of the substrate 41.

Figure 10:
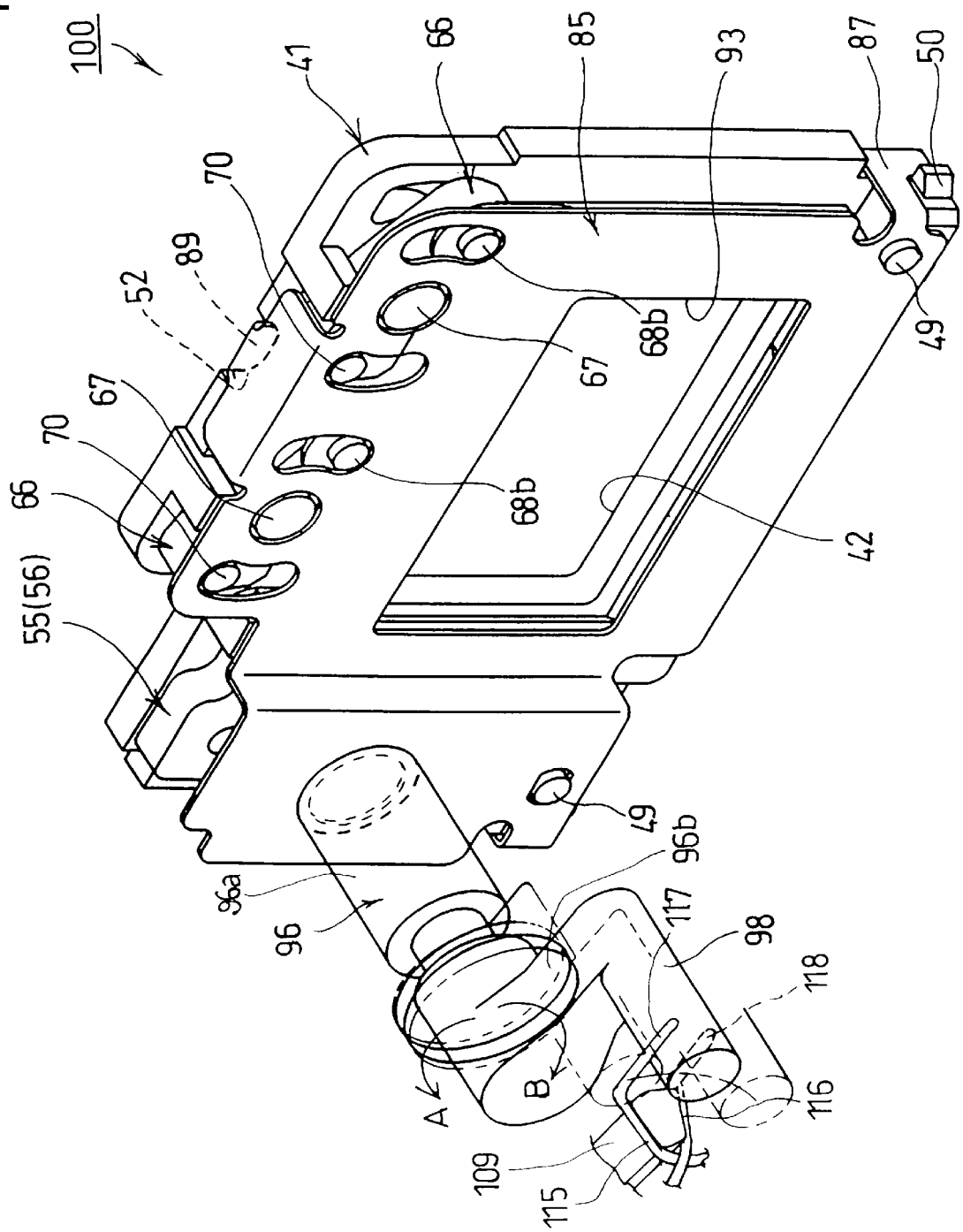
FIG. 10 is a perspective view of an assembly of a field frame switching apparatus shown in FIG. 6.
Figure 11:
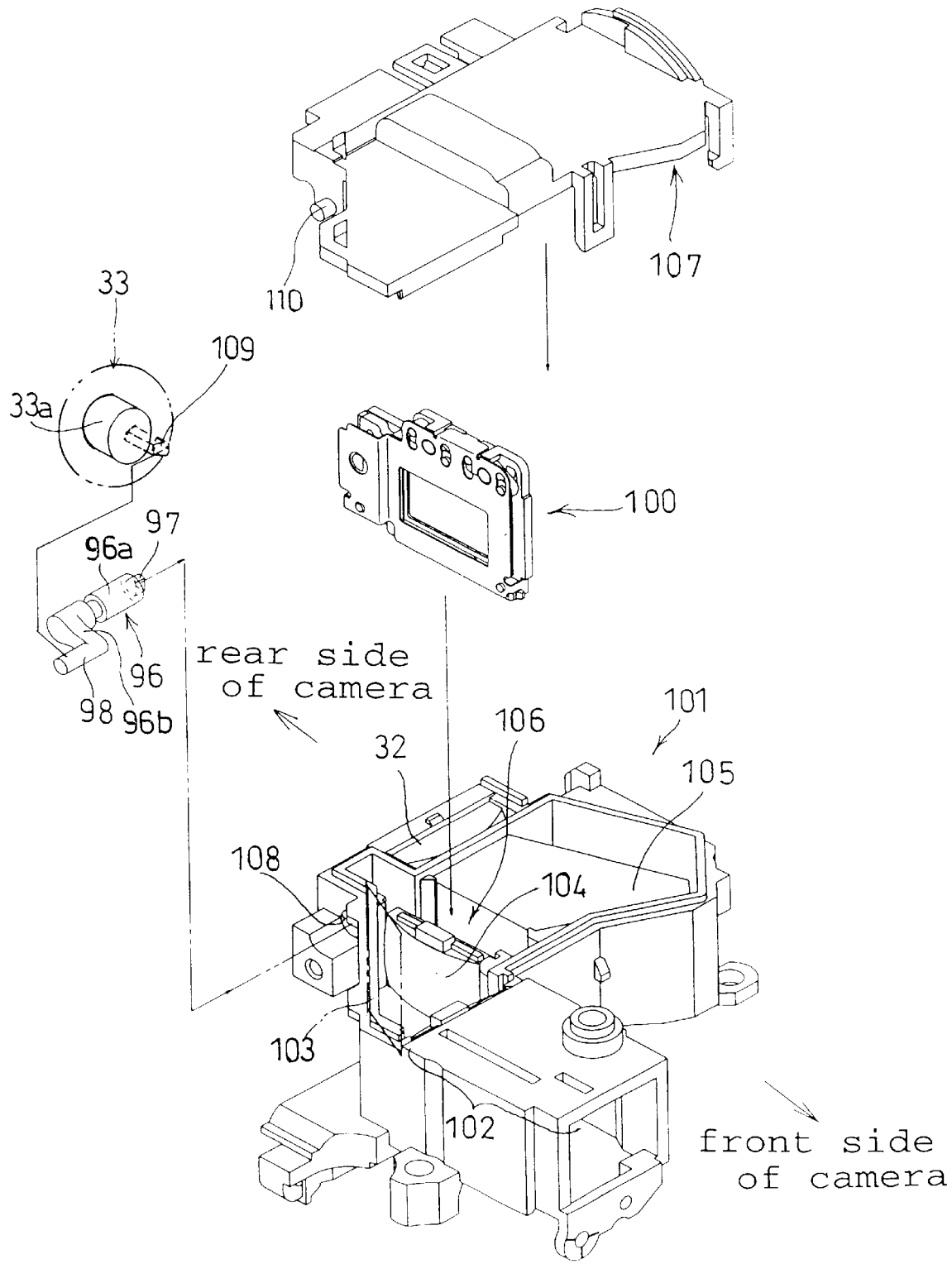
FIG. 11 is a perspective view of an entire finder optical system of a camera body.

The assembly of the field frame switching apparatus is shown in FIG. 10. The narrow-width field frame defining light-interception frame, the laterally-elongated field frame defining light-interception frame, and the association movement mechanism are held between the substrate 41 and the auxiliary plate 85 to form a field frame switching unit 100. The unit 100 also holds therein the swing member 80 which is manipulated by the switching lever 96. After the unit 100 is completed, the unit is attached to the finder optical system supporting portion 101 (FIG. 11) of the camera body. The finder optical system supporting portion 101 is comprised of an objective optical system 102, a stationary mirror 103, a stationary lens 104, a Porro prism 105, and an eyepiece 32, in this order from the object side. In the finder optical system, the optical axis is bent in the form of a crank in a plan view by the stationary mirror 103 and the Porro prism 105 to obtain a sufficient optical path length within the camera body 11 which is slim in the front-rear direction. An object image formed by the objective system 102 is reflected by the stationary mirror 103 and is converged onto a focal surface immediately after the stationary lens 104, and is thereafter converted into an erect image by means of four reflection surfaces in total of the stationary mirror 103 and the Porro prism 105, so that the image can be viewed through the eyepiece 32.

The finder optical system support portion 101 includes a unit mounting portion 106 at a position corresponding to the focal plane. The field frame switching unit 100 is fitted in the unit mounting portion 106 so that the auxiliary plate 85 and the substrate 41 are opposed to the stationary lens 104 and the Porro prism 105, respectively. The unit mounting portion 106 is provided on the wall surface thereof with a through hole 108 through which the connection hole 84 of the swing member 80 can be exposed, so that the connection pin 97 of the switching lever 96 can be fitted in the connection hole 84. Note that although the field frame switching unit 100 is separate from the switching lever 96 to facilitate the assembling operation, it is possible to make the field frame switching unit integral with the switching lever 96 so as to form a single unit.

An upper cover 107 secured to the finder optical system support portion 101 from above is provided with a projection 110. When the upper cover 107 is mounted to the support portion 101, the projection 110 is located in the vicinity of the eccentric shaft portion 98 and the central shaft portion 96a of the switching lever 96.

When the connection pin 97 is fitted in the connection hole 84, the shaft of the switching lever 96 extends in the lateral direction of the camera body 11. The picture plane switching dial 33 rotates in a plane parallel with the back plate of the camera body 11. Namely, the axis of the central shaft portion 96a of the switching lever 96 extends perpendicular to the axis of the picture plane switching dial 33. The operation device for transmitting the operation of the switching dial 33 to the field frame switching unit 100 will be described below referring to FIGS. 12 through 17.

Figure 12:
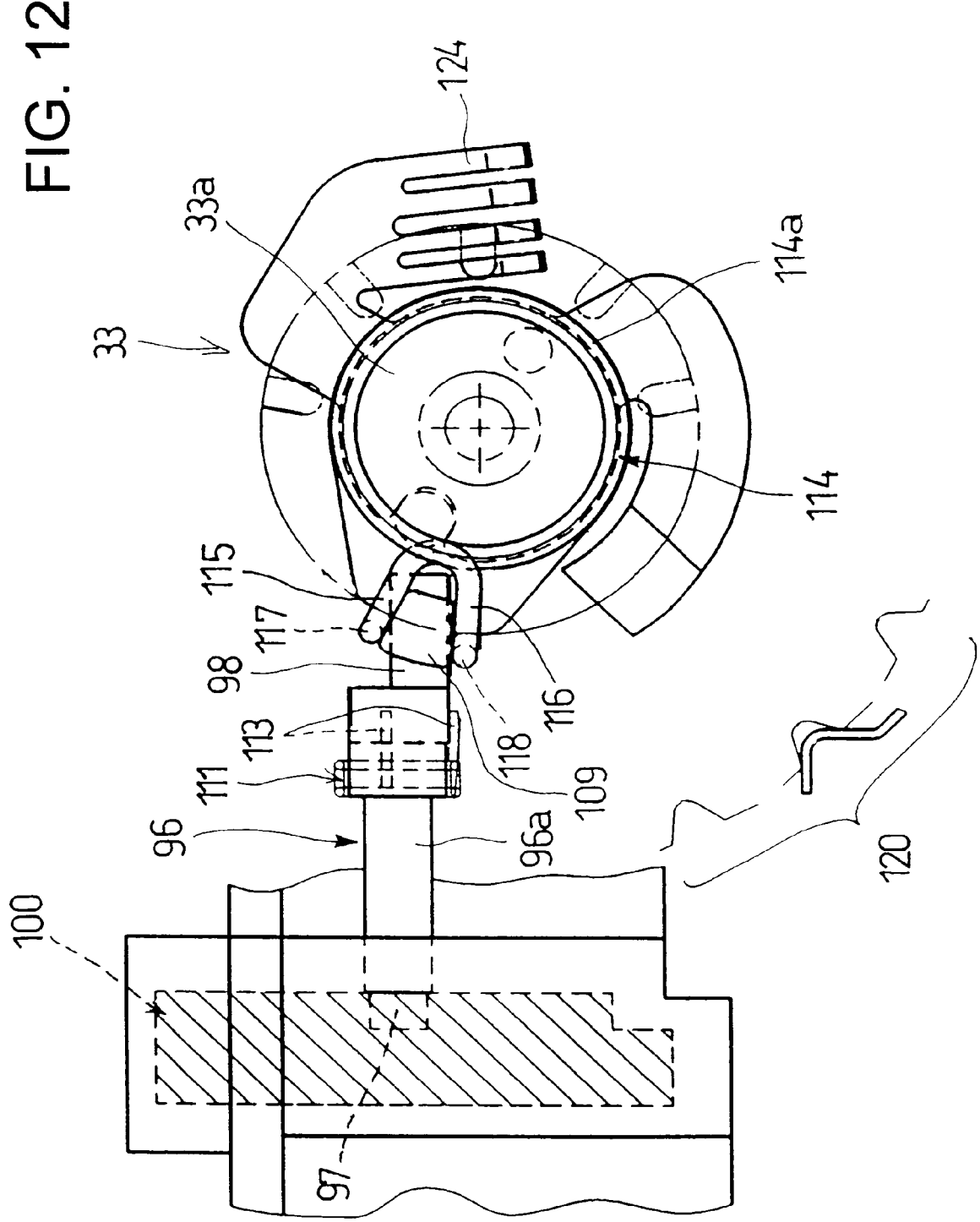
FIG. 12 is a rear elevational view of an operation device for a field frame switching mechanism when a picture plane switching dial is in a high vision position H.
Figure 15:
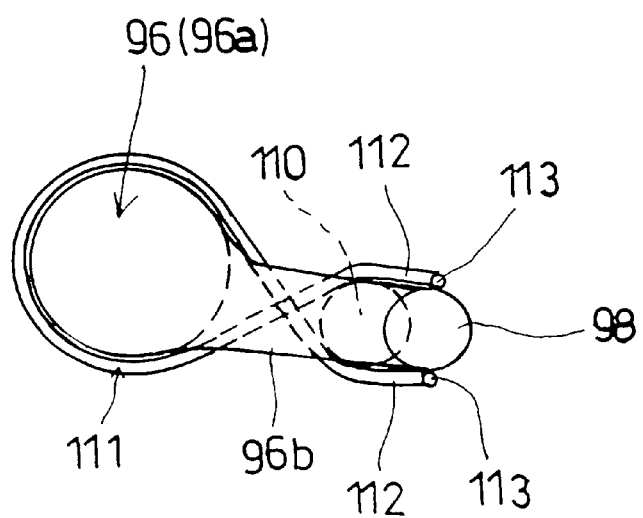
FIG. 15 is a view viewed from an arrow XV shown in FIG. 13.

As shown in FIG. 15, a coil portion of a neutral position holding spring 111 in the form of a torsion coil spring is wound about the central shaft portion 96a of the switching lever 96. The neutral position holding spring 111 is provided with a pair of projection holding portions 112 which extend across one another to hold therebetween the projection 110 of the upper cover 107. The projection holding portions 112 are each bent at substantially right angles at one end to form a shaft holding end 113 which holds the eccentric shaft portion 98. Thus, the switching lever 96 is elastically held in a predetermined position (FIG. 12). In this position of the switching lever 96, the swing member 80 is held in the neutral position (FIG. 7) in which the elongated groove 59 of the first L-shaped light-interception member 55 is aligned with the elongated groove 65 of the second L-shaped light-interception member 61. The position shown in FIG. 12 is referred to as a neutral angular position of the switching lever 96. Namely, the radially projecting portion of the switching lever 96 (the connecting portion 96b and the eccentric shaft portion 98), the projection 110 of the upper cover 107, and the neutral position holding spring 111 constitute a neutral position holding mechanism which biases the switching lever 96 toward the neutral angular position.

The picture plane switching dial 33 is provided with a click mechanism 120 between the switching dial and the camera body, which stops the switching dial at the three angular positions, i.e., the high vision position (H), the classic size position (C), and the panoramic size position (P). The switching dial 33 is also provided with a brush 124 which rotates integrally therewith and comes into sliding contact with a code plate provided in the camera body to detect the three click stop positions. The electric signal which represents the picture plane size is transmitted to the CPU provided in the camera body. The camera includes a magnetic recorder (not shown) in the vicinity of the film surface, so that data on the picture plane size detected by the brush 124 can be magnetically recorded in the magnetic recorder. Based on the recorded data, the right and left end edges or the upper and lower end edges of the picture plane corresponding to the classic size or panoramic size are cut upon development.

The switching dial 33 is provided on the rear surface thereof with a projection (stop) 109 eccentric from the center axis of the shaft 33a. A coil portion 114a of a lever drive spring 114 in the form of a torsion coil spring is wound about the shaft portion 33a. The coil portion 114a is provided with a pair of projection holding portions 115, 116 which extend across one another in the radial direction of the shaft portion 33a. The lever drive spring 114 is twisted in the direction to bias the projection holding portions 115, 116 close to each other. The projection 109 is inserted between the projection holding portions 115 and 116 slightly increasing the distance therebetween. When the rotation of the switching dial 33 takes place, the lever drive spring 114 is rotated together.

Figure 13:
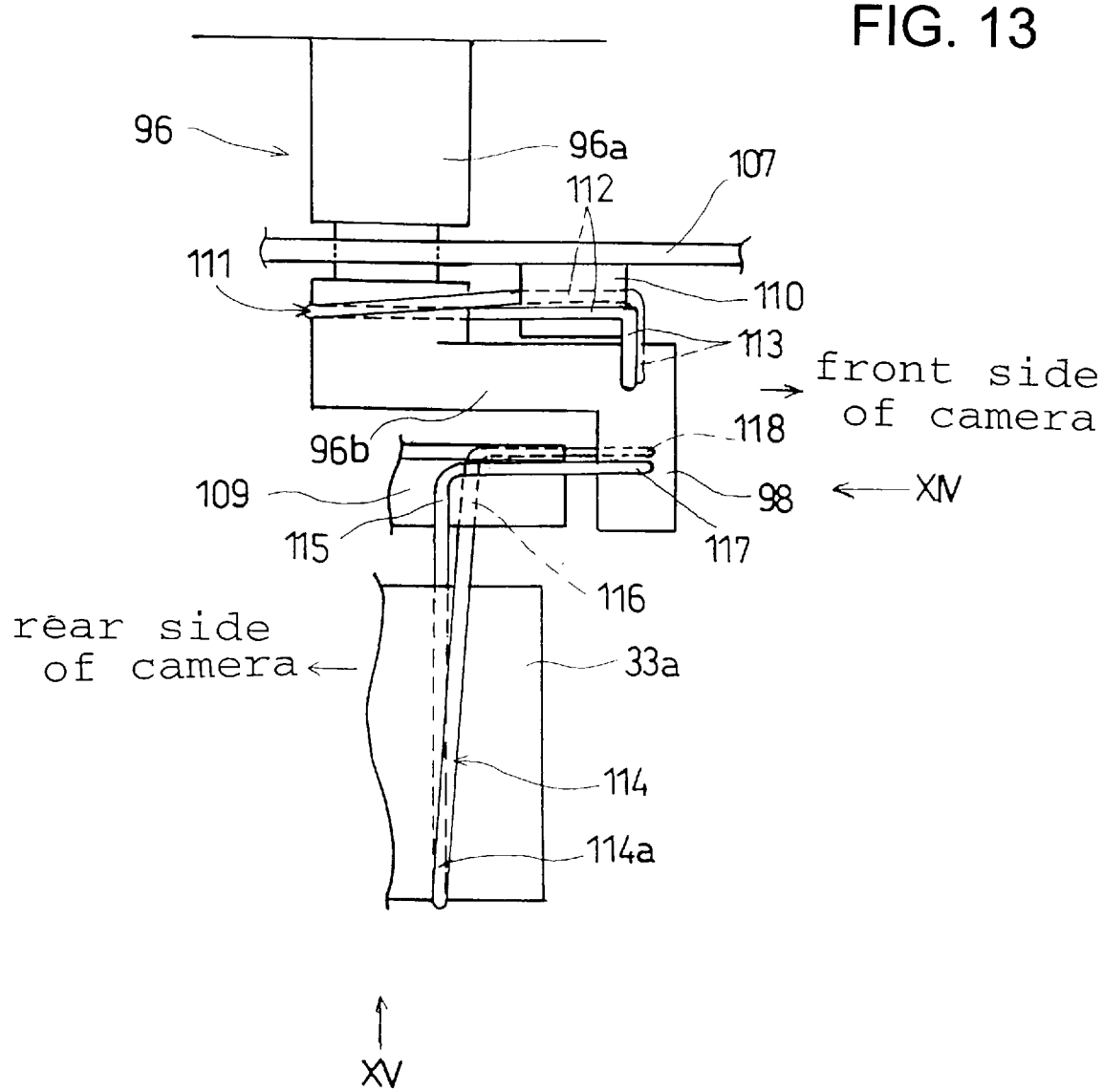
FIG. 13 is a plan view of a main part of an operation device for a field frame switching mechanism shown in FIG. 12.
Figure 14:
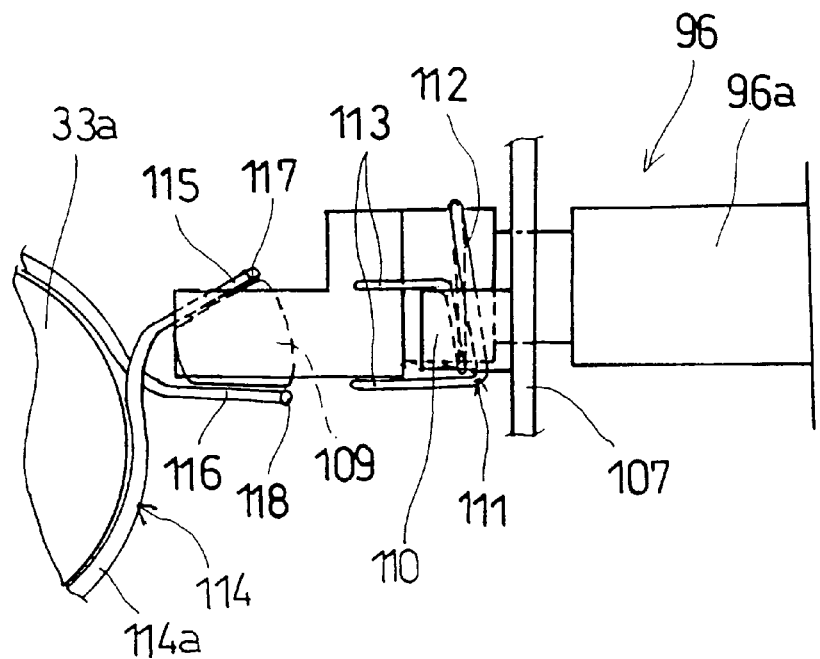
FIG. 14 is a view viewed from an arrow XIV shown in FIG. 13.

The projection holding portions 115 and 116 are each bent at one end in the direction substantially parallel with the axis of the shaft portion 33a to form bent ends 117 and 118 which are opposed on opposite sides of a eccentric shaft portion 98 of the switching lever 96 when the switching dial 33 is mounted to the camera body 11. The distance between the bent ends 117 and 118 is held to be slightly larger than the diameter of the eccentric shaft portion 98 by the projection 109 held between the projection holding portions 115 and 116 (FIGS. 13 and 14).

Figure 16:
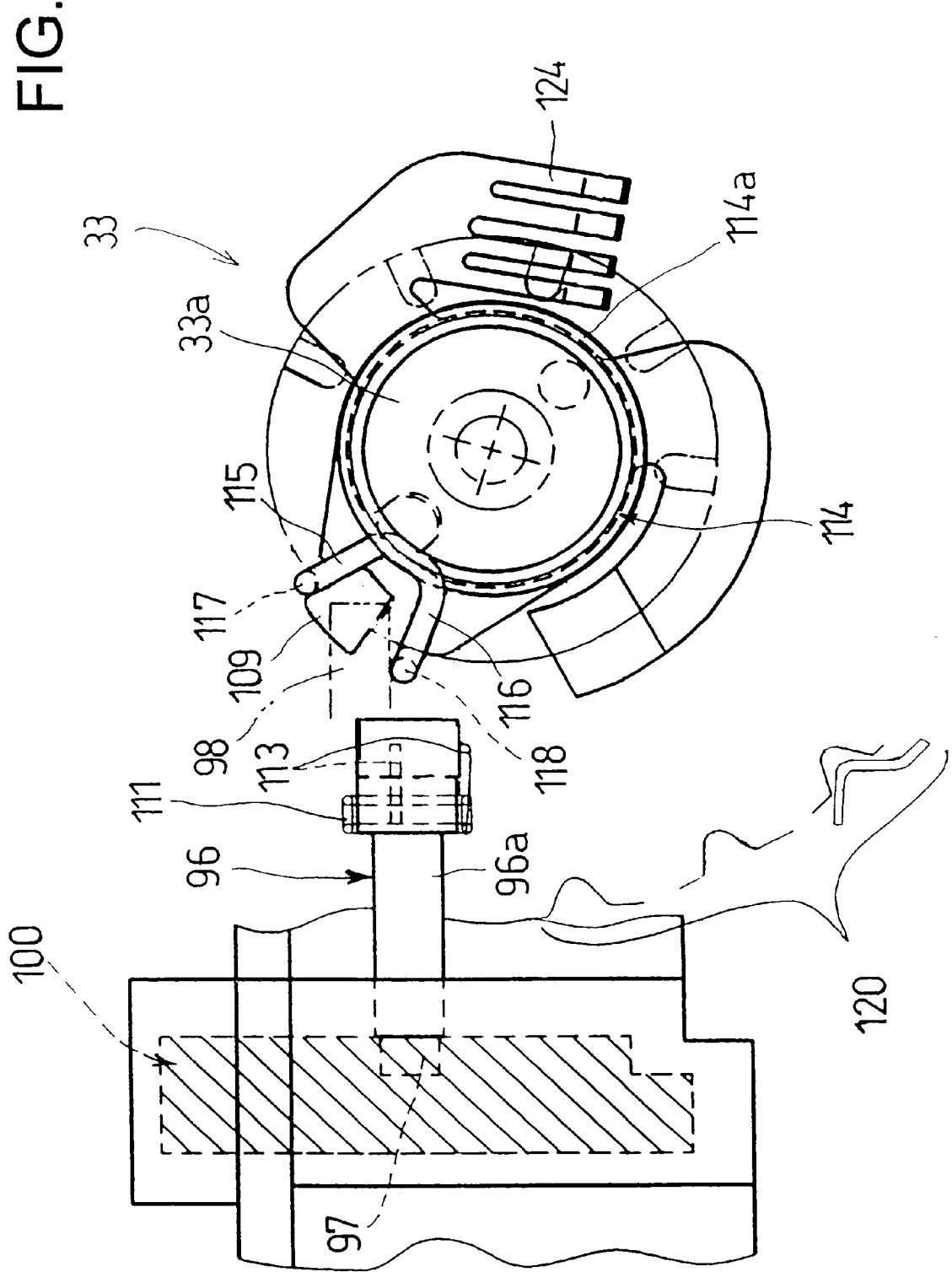
FIG. 16 is a rear elevational view of an operation device for a field frame switching mechanism when a picture plane switching dial is in a classic size position C.
Figure 17:
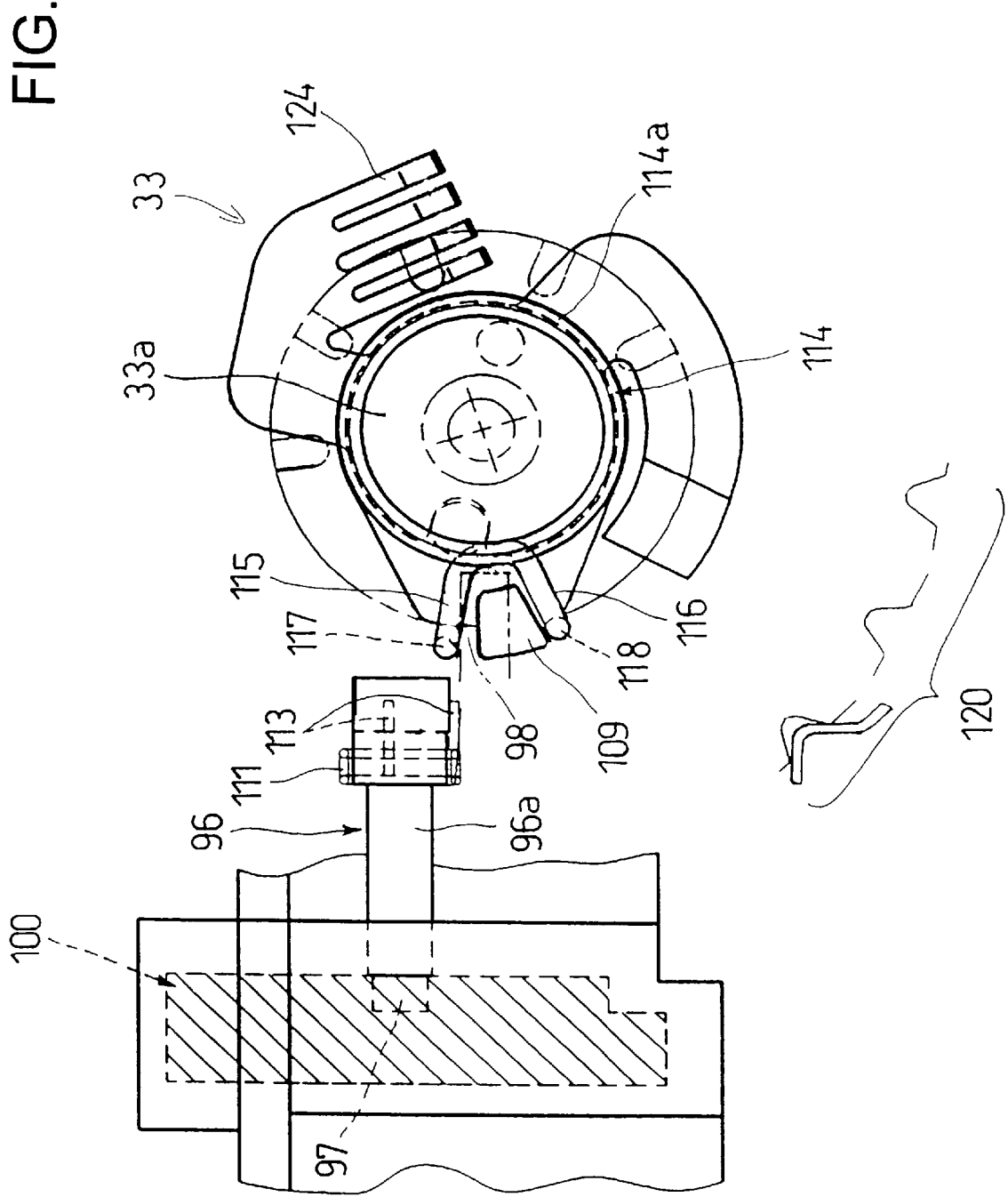
FIG. 17 is a rear elevational view of an operation device for a field frame switching mechanism when a picture plane switching dial is in a panoramic size position P.

When the switching dial 33 is click-stopped at the high vision position (H), the bent ends 117 and 118 are spaced from the eccentric shaft portion 98 (FIG. 12). In this state, the neutral position holding spring 111 holds the switching lever 96 in the neutral angular position. If the switching dial 33 is rotated to the classic size position (C), the lever drive spring 114 is rotated in the direction to bring the bent end 118 into contact with the eccentric shaft portion 98 (FIG. 16). If the switching dial 33 is rotated to the panoramic size position (P), the lever drive spring 114 is rotated in the direction to bring the bent end 117 into contact with the eccentric shaft portion 98 (FIG. 17). When the bent end 117 or 118 engages with the eccentric shaft portion 98, the spring force of the neutral position holding spring 111 and the spring force of the lever drive spring 114 act on the switching lever 96 simultaneously. However, since the restoring spring force of the lever drive spring 114 is stronger than the spring force of the neutral position holding spring 111, when the switching dial 33 is rotated to the classic size position (C) or the panoramic size position (P), the bent end 117 or 118 rotates the switching lever 96 in the forward or reverse direction through the eccentric shaft portion 98 against the neutral position holding spring 111.

As mentioned above, the rotation of the switching lever 96 in the forward or reverse direction can take place within the range in which the sliding movement of the first or second L-shaped light-interception member 55 or 61 occurs. The switching dial 33 is clicked at the classic size position (C) or the panoramic size position (P), with respect to the high vision size position (H), and hence the angular displacement of the switching dial 33 is also restricted. In the illustrated embodiment, the angular displacement of the switching dial 33 from the high vision size position (H) to the classic size position (C) or to the panoramic size position (P) in the forward or reverse direction is larger than the sliding movement of the first or second L-shaped light-interception member 55 or 61 from the neutral position to the extremity position in which the first or second L-shaped light-interception member abuts against the end of the guide groove 43 or 44 in the forward or reverse direction. Consequently, the guide pins 57 or 63 of the first or second L-shaped light-interception member 55 or 61 abut against the ends of the guide grooves 43 or 44 before the switching dial 33 is clicked at the classic size position (C) or panoramic size position (P). If the switching dial 33 which can be rotated further is rotated to the click position, the lever drive spring 114 is elastically deformed to bias the switching lever 96, so that the first and second L-shaped light-interception members 55 and 61 are pressed at the sliding movement restriction positions. Thus, the lever drive spring 114 does not drive the field frame switching mechanism when the switching dial 33 is in the high vision position (H) and drives the field frame switching mechanism with a strong force when the switching dial 33 is rotated to classic size position (C) or panoramic size position (P).

The field frame switching mechanism and the operation device therefor operate as follows.

In FIGS. 7 through 9, the frame indicated by two-dotted chain line and dashed line defines the rectangular opening 93 corresponding to the standard field frame (high vision size field frame).

FIG. 12 shows the operation device for the field frame switching mechanism when the switching dial 33 is in the high vision size position (H). Since the bent ends 117 and 118 of the lever drive spring 114 are separate from the eccentric shaft portion 98, the switching lever 96 is held in the neutral angular position by the neutral position holding spring 111, so that the swing member 80 is held in the neutral position. In this state, the field frame switching mechanism is as shown in FIG. 7.

In FIG. 7, the swing member 80 is in the neutral position, the vertical light-interception wall 58 of the first L-shaped light-interception member 55 and the vertical light-interception wall 64 of the second L-shaped light-interception member 61 are located out of the angle of view defined by the rectangular opening 93. The first L-shaped light-interception member 55 is located in a position in which a pair of cam engagement projections 60 raise the planar surface portions 69b of the lower cam surfaces 69 of a pair of swing cams 66. Consequently, the swing cams 66 which move the second hanging pins 70 upward and move the first hanging pins 68b downward to move the lateral-light-interception plate 71 out of the angle of view of the rectangular opening 93 and hold the light-interception frame 73 so that the rectangular opening 76 is substantially identical to the rectangular opening 42 of the substrate 41. Namely, when the switching dial 33 is in the high vision position (H), the rectangular opening 93 of the auxiliary plate 85 defines the field frame of the finder.

When the switching dial 33 is rotated to the classic size position (C) from the high vision position (H) in the clockwise direction in FIG. 12, the lever drive spring 114 is rotated together in the clockwise direction (FIG. 16). Consequently, the bent end 118 engages with the eccentric shaft portion 98 to rotate the eccentric shaft portion upward. As a result, the switching lever 96 is rotated in the direction "A" in FIG. 10 due to the difference in the spring force between the lever drive spring 114 and the neutral position holding spring 111. Thus, the swing member 80 rotates in the counterclockwise direction from the neutral position in FIG. 7.

In this state, the field frame switching mechanism is as shown in FIG. 8. The rotation of the swing member 80 causes the operation projection 81 to press the elongated groove 59 in the left direction, and hence, the first L-shaped light-interception member 55 is slid in the left direction in FIG. 7 while being guided by a pair of guide grooves 43. Simultaneously, the second L-shaped light-interception member 61 is slid in the right direction in FIG. 7 while being guided by the guide grooves 44 since the operation projection 82 presses the elongate groove 65 in the right direction. Consequently, the vertical light-interception walls 58 and 64 are moved into the rectangular opening 93 at the lateral ends thereof. Thus, the field frame is interrupted by the light-interception walls 58 and 64, and hence the lateral width of the field frame is reduced accordingly. On the other hand, when the first L-shaped light-interception member 55 is slid in the left direction, no height of the engagement portion between the projections 60 and the cam surfaces 69 changes since the extensions of the cam surfaces 69 of the swing cams 66 in the direction of the movement of the cam engagement projections 60 are planar. Therefore, no rotation of the swing cams 66 occurs in FIG. 7. Consequently, the laterally-elongated light-interception plate 71 and the light-interception frame 73 (lateral-light-interception wall 75) are retained out of the angle of view of the rectangular opening 93 without being moved. Namely, the field frame in the vertical direction is determined by the rectangular opening 93. In this state, the lengthwise-crosswise ratio of the field frame is 2:3 corresponding to the narrow-width field frame (classic size).

The angular displacement of the switching dial 33 from the high vision position (H) to the classic size position (C) is larger than the displacement of the first or second L-shaped light-interception member 55 or 61 from the high vision visual-field-forming position (neutral position) to the narrow-width visual-field-forming position. Therefore, in FIG. 16, the upward rotation of the eccentric shaft portion 98 which is associated with the light-interception members 55 and 61 through the swing member 80 is restricted, and the lever drive spring 114 is slightly deformed to press the eccentric shaft portion 98 in the restriction direction.

The operation device for the field frame switching mechanism when the switching dial 33 is rotated from the high vision position (H) to the panoramic size position (P) is shown in FIG. 17. Since the switching dial 33 is rotated in the counterclockwise direction in FIG. 17, the lever drive spring 114 is rotated together in the counterclockwise direction. Consequently, the bent end 117 engages with the eccentric shaft portion 98 to rotate the latter downward, so that the switching lever 96 is rotated in the direction "B" in FIG. 10 due to the difference in the spring force between the lever drive spring 114 and the neutral position holding spring 111. Consequently, the swing member 80 is rotated in the clockwise direction from the neutral position in FIG. 7.

The field frame switching mechanism is shown in FIG. 9. Since the operation projection 82 presses the groove 65 in the left direction in FIG. 7 in accordance with the rotation of the swing member 80, the second L-shaped light-interception member 61 is slid in the left direction in FIG. 7 while being guided by the guide grooves 44. Simultaneously, the first L-shaped light-interception member 55 is slid in the right direction in FIG. 7 while being guided by the guide grooves 44 since the operation projection 81 presses the elongated groove 59 in the right direction. In the sliding movement, the vertical light-interception walls 58 and 64 are moved away from the rectangular opening 42 or 93. Thus, no change in the size of the field frame occurs. The lateral width of the visual field is determined by the rectangular opening 93. When the first L-shaped light-interception member 55 is slid in the right direction, the cam engagement projections 60 of the first L-shaped light-interception member 55 are fitted in the recesses 69a of the cam surfaces 69. Consequently, the swing cams 66 are rotated in the counterclockwise direction in FIG. 7, so that the second hanging pins 70 are moved downward and the first hanging pins 68b are moved upward. Thus, the light-interception plate 71 is substantially translated downward and the light-interception frame 73 is substantially translated upward. Consequently, the light-interception plate 71 and the lateral-light-interception portion 75 of the light-interception frame 73 are moved into the rectangular opening 93 at the upper and lower end edges thereof. Since the upper and lower ends of the rectangular opening 93 are interrupted by the light-interception plate 71 and the lateral-light-interception portion 75, the width of the field frame in the vertical direction is reduced accordingly. In this state, the lengthwise-crosswise ratio of the field frame is 1:3 corresponding to the laterally-elongated field frame (panoramic size).

The angular displacement of the switching dial 33 from the high vision position (H) to the panoramic size position (P) is larger than the displacement of the first or second L-shaped light-interception member 55 or 61 from the high vision visual-field-forming position (neutral position) to the laterally-elongated visual-field-forming position. Therefore, in FIG. 17, the downward rotation of the eccentric shaft portion 98 which is associated with the light-interception members 55 and 61 through the swing member 80 is restricted, and the lever drive spring 114 is slightly deformed to press the spring engaging projection 98 in the restriction direction.

When the switching dial 33 is rotated to the high vision position (H) from the classic size position (C) or the panoramic size position (P), the pressure acting on the lever drive spring 114 is released, so that the switching lever 96 is returned to the neutral angular position by the neutral position holding spring 111. Consequently, the field frame switching mechanism is returned to the standard field frame corresponding to the high vision size.

In summary, when the switching dial 33 is located in the high vision position (H), the switching lever 96 is held in the neutral angular position by the neutral position holding spring 111, and the field frame switching mechanism defines the visual field corresponding to the high vision size. In this position, if the switching dial 33 is rotated to the classic size position (C) or the panoramic size position (P), the switching lever 96 is rotated in the forward or reverse direction by the lever drive spring 114 which is stronger than the neutral position holding spring 111 to the position in which the field frame switching mechanism forms the field frame corresponding to the classic size or panoramic size.

The following advantages can be expected from the illustrated embodiment:

For the field frame switching mechanism, since the laterally-elongated field forming light-interception frames (the laterally extending light-interception plate 71 and the light-interception frame 73) are driven only when the panoramic size is selected, it is not necessary to provide upper and lower spaces above and below the field frame, in which spaces the light-interception members are retracted, thus resulting in an enhanced utilization efficiency of the pace around the field frame. Moreover, since the narrow-width field forming light-interception frames (the L-shaped light-interception members 55 and 61) and the laterally-elongated field forming light-interception frames (laterally-elongated light-interception plate 71 and the light-interception frame 73) are driven in one direction, and the laterally-elongated field forming light-interception frames are moved up and down using the swing cams 66 with the help of the force caused by the lateral movement of the narrow-width field forming light-interception frames, not only can the light-interception members be stably supported, the structure of the drive mechanism can also be simplified.

Since the narrow-width field forming light-interception frames (the L-shaped light-interception members 55 and 61), the laterally-elongated field forming light-interception frames (laterally-elongated light-interception plate 71 and the light-interception frame 73), and the swing cams 66 as an association movement mechanism for these light-interception frames are mounted to the substrate 41 and are held between the substrate and the auxiliary plate 85, the field frame switching mechanism can be formed as the unit 100. The unit 100 supports therein the swing member 80 which is rotated by the switching lever 96 which can be externally actuated, so that when the connection pin 97 of the switching lever 96 is fitted in the connection hole 84 of the swing member 80, the unit 100 is capable of operating without disassembling the unit 100. Moreover, since the finder optical system support portion 101 to which the unit 100 is attached is provided with the through hole 108 through which the connection hole 84 is exposed to the outside, the switching lever 96 can be connected after the unit 100 is mounted. Consequently, the field frame switching mechanism can be more easily assembled than known field frame switching mechanisms.

In connection with the operation device for the field frame switching mechanism, the neutral position holding mechanism which is composed of the switching lever 96 and the neutral position holding spring 111 is connected after the unit 100 is mounted, and the operation means on the switching dial 33 is separately incorporated. The neutral position holding mechanism can be easily assembled from outside of the unit 100 and can be connected to the unit 100 without any play. Therefore, no positional deviation occurs in the light-interception members, and thus the neutral position can be stably established. Furthermore, since the bent ends 117 and 118 of the lever drive spring 114 are spaced from the eccentric shaft portion 98 at the neutral position, it is possible to increase the tolerance for absorbing assembling error. Consequently, the assembling operation of the operation device can be facilitated. Moreover, since the lever drive spring 114 is rotated by an angular displacement slightly larger than necessary, the light-interception members can be moved to and held in the narrow-width field forming position or the laterally-elongated field forming position, even if there is an assembling error to some extent.

The present invention is not limited to the illustrated embodiment. For instance, although the narrow-width field forming light-interception frames which are moved in the lateral direction of the (laterally-elongated) standard field frame are moved in opposite directions to the narrow-width field forming position or laterally-elongated field forming position from the standard field forming position (neutral position) by means of the external operation device (the laterally-elongated field forming light-interception frames which are moved in the upward and downward directions of the field frame are moved in association with the movement of the narrow-width field forming light-interception frames from the neutral position to the laterally-elongated field forming position) the opposite can be the case. Namely, it is possible to drive the narrow-width field forming light-interception frames in association with the laterally-elongated field forming light-interception frames. In this alternative, the lengthwise-crosswise length ratio of the field-frame-forming components is opposite to that in the illustrated embodiment. That is, in this alternative, the laterally-elongated field forming light-interception frames are moved in opposite directions from the neutral position by the external operation device, and the narrow-width field forming light-interception frames are moved in association with the movement of the laterally-elongated field forming light-interception frames only when the latter are moved from the neutral position to the narrow-width field forming position.

Although the standard field frame is formed on the auxiliary plate 85, it is possible to form the same on the substrate 41.

Moreover, although the neutral position holding spring 111 and the lever drive spring 114 are both in the form of a torsion spring having a coil portion, they can be made of other type of spring. For example, it is possible to directly secure a pair of spring members corresponding to the bent ends of the lever drive spring 114 to the rear surface of the switching dial 33. Likewise, it is possible to provide a spring member having portions corresponding to the projection holding portion 112 and the shaft holding end portion 113 of the neutral position holding spring 111, protruding from the upper cover 107.

It is possible to apply the operation device for a rotation operation member having a neutral position to an apparatus other than the field frame switching mechanism of the finder. For instance, the present invention can be applied to a video deck in which the fast winding and rewinding of a tape are carried out using a rotary dial switch which can be rotated in the forward and reverse directions. The application to the video deck will be discussed below.

A rotary switch lever having a central shaft portion and a radial pin extending therefrom in the radial direction is provided in the video deck. The switch lever which is rotatable about the axis of the central shaft portion is selectively rotatable among a neutral angular position, a first angular position spaced from the neutral angular position in the forward direction and a second angular position spaced from the neutral position in the reverse direction. When the switch lever is located at the neutral angular position, the switch is OFF; when the switch lever is located at the first or second angular position, the fast winding or rewinding switch is turned ON. The switch lever is normally held in the neutral position by a first torsion spring. When the switch lever is rotated to the first or second angular position, the torsion spring is deformed to bias the switch lever toward the neutral position. The shaft portion of the dial member provided on the outer surface of the video deck supports the coil portion of a second torsion coil spring. The ends of the second torsion spring are arranged so as to hold therebetween the radial pin of the rotary switch lever. The spring ends are biased toward each other. The dial operation member is also provided with a projection which keeps the distance between the spring ends at a value larger than the diameter of the radial pin of the rotary switch lever in a free state. The second torsion coil spring is stronger than the first torsion coil spring. A dial type operation switch in which when the rotary switch lever which is normally held in the neutral position is rotated in the forward or reverse direction, the tape is fast wound or rewound and in which no malfunction occurs can be easily obtained.

As can be understood from the above discussion, according to the present invention, in a camera in which the laterally-elongated standard visual field, the narrow-width visual field in which the right and left end edges of the standard visual field are interrupted, and the laterally-elongated visual field in which the upper and lower end edges of the standard visual field are blocked out can be selected, a simple field frame switching apparatus which can be easily assembled and in which the drive mechanism is simple and the internal space can be effectively utilized is provided. Moreover, according to the present invention, an operation apparatus for a finder field frame switching mechanism, which can be easily assembled and in which no operation error or positional deviation of the light-interception members occurs is provided. Furthermore, an operation apparatus for a rotary operation member having a neutral position, which can be easily assembled is provided, wherein the neutral position and predetermined angular positions spaced from the neutral position in the forward and reverse directions can be certainly obtained.

What is claimed is:

1. A field frame switching apparatus for a finder in which an elongated standard visual field, a narrow-width visual field in which the standard visual field is partly blocked out at right and left ends thereof, and a laterally-elongated visual field in which the standard visual field is partly blocked out at upper and lower ends thereof can be selected, comprising:

a pair of narrow-width visual-field-forming light-interception frames which are movable in the right and left directions of said standard visual field and are provided with vertical light-interception walls which are adapted to block out the right and left ends of said standard visual field, said narrow-width visual-field-forming light-interception frames substantially forming a rectangle therebetween;

a pair of laterally-elongated visual-field-forming light-interception frames which are movable in the upward and downward directions of said standard visual field and are provided with lateral-light-interception walls which are adapted to block out the upper and lower ends of said standard visual field;

an operation member which is adapted to move said narrow-width visual-field-forming light-interception frames in a first direction toward a narrow-width field-frame-forming position in which said vertical light-interception walls are located within said standard visual field frame and in a second direction toward a laterally-elongated field-frame-forming position, with respect to a standard field-frame-forming position in which said vertical light-interception walls are located out of said standard visual field frame; and an association movement mechanism comprising a pair of projections provided on one of said narrow-width field forming light-interception frames adapted to move said lateral-light-interception walls of said laterally-elongated field forming light-interception frames into or from said standard visual field frame in association with the movement of said narrow-width field forming light-interception frames when said narrow-width field forming light-interception frames are moved between said standard field-frame-forming position and said laterally-elongated field-frame-forming position.

2. A field frame switching apparatus for a finder according to claim 1, wherein said association movement mechanism further comprises a pair of swing cam members which are provided with cam surfaces engaging with said projections and which rotate about axes substantially perpendicular to a plane in which said field frame lies in accordance with the linear movement of said narrow-width field forming light-interception frames, wherein said swing cam members rotate to move said laterally-elongated field forming light-interception frames in opposite directions and in the upward and downward directions of said standard visual field.

3. A field frame switching apparatus for a finder according to claim 2, wherein said swing cam members are arranged in parallel with the major sides of said standard visual field;

said laterally-elongated visual-field-forming light-interception frames comprise first laterally rectangular light-interception walls which are directly supported by said swing cam members and second lateral-light-interception walls which are supported by said cam members through support members which extend in the vertical direction of said standard visual field.

4. A field frame switching apparatus for a finder according to claim 2, wherein said operation member is provided with a shaft member which rotates about an axis perpendicular to a plane in which said visual field frame lies, wherein provision is made of a swing member separate from said swing cam members, which linearly moves said narrow-width field forming light-interception frames in opposite lateral directions of said standard visual field in association with the rotation of said operation member.

5. The field frame switching apparatus for a finder according to claim 1, further comprising:

a first plate having an opening for a standard visual field; and a second plate having an opening for a standard visual field which corresponds to the opening of said first plate, said narrow-width field forming light-interception frames, said laterally-elongated field forming light-interception frames, and said association movement mechanism between said said first and second plates so as to form an assembly unit.

6. The field frame switching apparatus for a finder according to claim 1, said operation member transmitting motion to said pair of narrow-width visual-field-forming light-interception frames, one said narrow-width visual-field-forming light-interception frames in turn transmitting motion to said association movement mechanism, which in turn transmits motion to said pair of laterally-elongated visual-field-forming light-interception frames.

7. A field frame switching apparatus for a finder in which an elongate standard visual field, a narrow-width visual field in which said standard visual field is partly interrupted at right and left ends thereof, and a laterally-elongated visual field in which said standard visual field is partly blocked out at upper and lower ends thereof can be selected, comprising:

a pair of narrow-width visual-field-forming light-interception frames which are movable in the right and left directions of said standard visual field and which are provided with vertical light-interception walls which are adapted to block out the right and left ends of said standard visual field, said narrow-width visual-field-forming light-interception frames substantially forming a rectangle therebetween;

a pair of laterally-elongated visual-field-forming light-interception frames which are movable in the upward and downward directions of said standard visual field and which are provided with lateral-light-interception walls which are adapted to block out the upper and lower ends of said standard visual field;

an operation member which is adapted to move said laterally-elongated visual-field-forming light-interception frames in a first direction toward a laterally-elongated field-frame-forming position in which said lateral-light-interception walls are located within the standard visual field frame and in a second direction toward a narrow-width field-frame-forming position, with respect to a standard field-frame-forming position in which said lateral-light-interception walls are located out of said standard visual field frame; and an association movement mechanism comprising a pair of projections provided on one of said narrow-width field forming light-interception frames adapted to move said vertical light-interception walls of said narrow-width field forming light-interception frames into or from said standard visual field frame in association with the movement of said laterally-elongated field forming light-interception frames when said laterally-elongated field forming light-interception frames are moved between said standard field-frame-forming position and said narrow-width field-frame-forming position.

8. The field frame switching apparatus for a finder according to claim 7, further comprising:

a first plate having an opening for a standard visual field; and a second plate having an opening for a standard visual field which corresponds to the opening of said first plate, said narrow-width field forming light-interception frames, said laterally-elongated field forming light-interception frames, and said association movement mechanism between said said first and second plates so as to form an assembly unit.

9. The field frame switching apparatus for a finder according to claim 7, said operation member transmitting motion to said pair of narrow-width visual-field-forming light-interception frames, one said narrow-width visual-field-forming light-interception frames in turn transmitting motion to said association movement mechanism, which in turn transmits motion to said pair of laterally-elongated visual-field-forming light-interception frames.

10. A field frame switching apparatus for a finder in which an elongated standard visual field, a narrow-width visual field in which said standard visual field is partly blocked out at right and left ends thereof, and a laterally-elongated visual field in which said standard visual field is partly blocked out at upper and lower ends thereof can be selected, comprising:

a first plate having an opening for a standard visual field;

a pair of narrow-width visual-field-forming light-interception frames which are movable in the right and left directions of said standard visual field and which are provided with vertical light-interception walls are adapted to block out the right and left ends of said standard visual field;

a pair of laterally-elongated visual-field-forming light-interception frames which are movable in the upward and downward directions of said standard visual field and which are provided with lateral-light-interception walls which are adapted to block out the upper and lower ends of said standard visual field;

an operation member which is adapted to move said narrow-width visual-field-forming light-interception frames in a first direction toward a narrow-width field-frame-forming position in which said vertical light-interception walls are located within said standard visual field frame and in a second direction toward a laterally-elongated field-frame-forming position with respect to a standard field-frame-forming position in which said vertical light-interception walls are located out of said standard visual field frame;

an association movement mechanism which moves said lateral-light-interception walls of said laterally-elongated field forming light-interception frames into or from said standard visual field frame in association with the movement of said narrow-width field forming light-interception frames when said narrow-width field forming light-interception frames are moved between said standard field-frame-forming position and said laterally-elongated field-frame-forming position; and a second plate having an opening for a standard visual field which corresponds to the opening of said first plate, said first and second plates holding said narrow-width field forming light-interception frames, said laterally-elongated field forming light-interception frames, and said association movement mechanism therebetween so as to form an assembly unit.

11. A field frame switching apparatus for a finder according to claim 10, wherein the portion of said assembly unit held between said first and second plates is separate from said operation member.

12. A field frame switching apparatus for a finder according to claim 10, wherein said operation member is comprised of a shaft portion which is rotatable about an axis perpendicular to a plane in which said standard field frame lies, wherein provision is made of a swing member which is held between said first and second plates and which linearly move the narrow-width field forming light-interception frames in the lateral opposite directions of the standard visual field in accordance with the rotation of the operation member.

13. A field frame switching apparatus for a finder according to claim 12, wherein said swing member is provided with a non-circular hole which is adapted to connect the same to said operation member to thereby form a unit.

14. A field frame switching apparatus for a finder according to claim 10, wherein the same is mounted to a finder body as a unit.

15. An operation apparatus for a field frame switching mechanism of a finder comprising:

a field frame switching mechanism which is adapted to change the size of the field frame among an elongated standard visual field, a narrow-width visual field in which the standard visual field is partly blocked out at right and left ends thereof, and a laterally-elongated visual field in which said standard visual field is partly blocked out at upper and lower ends thereof;

a swing member which has an axis about which the swing member is rotated, said swing member actuating the field frame switching mechanism by the swing movement thereof about the axis;

a shaft member separate from the swing member, said shaft member being rotatable about a central shaft portion thereof, said shaft member rotating the swing member about the axis thereof when the shaft member is rotated about the central shaft portion;

said shaft member being provided with a neutral angular position and predetermined forward and rearward angular positions in opposite directions from the neutral angular position, so that said field frame switching mechanism defines said standard visual field through said swing member when the shaft member is in the neutral angular position, and defines said narrow-width visual field and said laterally-elongated visual field when said shaft member is located in the predetermined forward and rearward angular positions, respectively; and a spring means for normally holding said shaft member at said neutral angular position and for exerting a spring force on said shaft member to return the same to said neutral angular position when said shaft member is rotated in a predetermined forward and rearward directions from said neutral angular position.

16. An operation apparatus according to claim 15, wherein said spring means is comprised of a first torsion spring which engages with a projection provided on a camera body and said radial projection of said shaft member to hold said shaft member at said neutral angular position.

17. An operation apparatus according to claim 15, further comprising a dial member which can be externally rotated and which is provided with a pair of spring ends that hold therebetween said radial projection of said shaft member, said spring ends being adapted to rotate said shaft member about the axis thereof through said radial projection against said first torsion spring when said dial member is rotated, said spring ends being capable of elastically deforming.

18. An operation apparatus according to claim 17, wherein said spring ends are provided on a second torsion spring which is provided with a coil portion that is supported by the shaft portion of said dial member, said spring ends being twisted and biased in a direction to come close to each other, said dial member being provided with a stop portion which keeps the distance between the spring ends in the free state, at a predetermined value so that said radial projection of the shaft member is inserted between the spring ends within a certain tolerance.

19. An operation apparatus according to claim 18, further comprising a click mechanism provided between said dial member and said camera body to hold said dial member at a neutral position or predetermined angular positions angularly spaced from said neutral position in opposite directions against the spring force of said first and second torsion springs.

20. An operation apparatus according to claim 19, wherein the movement of said light-interception member of said field frame switching mechanism is restricted at a narrow-width field forming position or a laterally-elongated field forming position with respect to a standard field forming position, wherein the click positions of said dial member rotated from the neutral position in opposite directions are set at positions in which the light-interception member is moved beyond the restriction positions.

21. An operation apparatus according to claim 20, wherein the spring ends of said second torsion spring are elastically deformed due to a difference between the angular displacement of said dial member and the movement of said light-interception member, so that said light-interception member can be held at said restriction position due to the restoring force of said spring ends.

22. An operation apparatus according to claim 17, wherein said dial member is incorporated in said camera body after said field frame switching mechanism and said shaft member are incorporated in said camera body.

23. An operation apparatus according to claim 15, wherein said swing member is separate from said shaft member and are interconnected so as not to relatively rotate after said field frame switching mechanism is assembled.

24. An operation apparatus according to claim 18, wherein said radial projection of the shaft member is in the form of a crank shaft comprised of a connecting portion extending in the radial direction and an eccentric shaft portion which extends from one end of said connecting portion in parallel with the center axis of said shaft member, so that said eccentric shaft portion is inserted between the spring ends of said second torsion spring.

25. An operation apparatus according to claim 17, wherein the center axis of the shaft member is perpendicular to the rotation axis of said dial member.

26. An operation apparatus for a rotary operation member having a neutral position, comprising a shaft member having a central shaft portion and a radial projection extending from the central shaft portion in the radial direction, said shaft member being rotatable about the central shaft portion;

said shaft member being provided with a neutral angular position and predetermined angular forward and rearward positions in opposite directions from said neutral angular position;

a first torsion spring means for normally holding said shaft member at said neutral angular position and for exerting a spring force on said shaft member to return the same to said neutral angular position when said shaft member is rotated in a predetermined direction from said neutral angular position;

a dial member which can be externally rotated;

a second torsion spring means having a coil portion which is supported by the shaft portion of said dial member and a pair of spring ends which are biased in a direction to come close to each other so that said radial projection of the shaft member is located between the spring ends, said second torsion spring means being stronger than said first torsion spring means; and a stop means provided on said dial member, for keeping the distance between the spring ends of said second torsion spring means, in the free state, at a predetermined value so that said radial projection is inserted between the spring ends within a certain tolerance.

* * * * *